(12) United States Patent
Drexler et al.

(10) Patent No.: US 11,794,399 B2
(45) Date of Patent: Oct. 24, 2023

(54) METHOD AND FORMING TOOL FOR HOT-FORMING A FLAT THERMOPLASTIC LAMINATE

(71) Applicant: Covestro Deutschland AG, Leverkusen (DE)

(72) Inventors: Christian Drexler, Garmisch-Partenkirchen (DE); Curt Niebling, Penzburg (DE)

(73) Assignee: Covestro Deutschland AG, Leverkusen (DE)

( * ) Notice: Subject to any disclaimer, the term of this patent is extended or adjusted under 35 U.S.C. 154(b) by 71 days.

(21) Appl. No.: 17/530,557

(22) Filed: Nov. 19, 2021

(65) Prior Publication Data

US 2022/0072760 A1 Mar. 10, 2022

Related U.S. Application Data

(60) Division of application No. 16/139,009, filed on Sep. 22, 2018, now Pat. No. 11,213,994, which is a
(Continued)

(30) Foreign Application Priority Data

Apr. 4, 2016 (DE) .......................... 102016004047.5

(51) Int. Cl.
*B29C 51/08* (2006.01)
*B29C 51/10* (2006.01)
(Continued)

(52) U.S. Cl.
CPC ............ *B29C 51/082* (2013.01); *B29C 51/10* (2013.01); *B29C 51/12* (2013.01); *B29C 51/145* (2013.01);
(Continued)

(58) Field of Classification Search
CPC . B29C 51/303; B29C 51/10; B29C 2791/007; B29C 51/82
(Continued)

(56) References Cited

U.S. PATENT DOCUMENTS 4,185,069 A * 1/1980 Smith .................... B29C 51/262
425/384
5,108,350 A 4/1992 Szpakowski
(Continued)

FOREIGN PATENT DOCUMENTS

DE 2603782 A1 8/1977
DE 3840542 C1 11/1989
(Continued)

OTHER PUBLICATIONS

Dehn, et al., FIT database machine-translation to English of DE-10153035-A1, "Frame for controlled retention of fiber reinforcement mats during shaping on a press tool comprises elastic strips pressed onto both sides of the mat", B29C70/56, May 2003. (Year: 2003 ).*
(Continued)

*Primary Examiner* — Matthew J Daniels
*Assistant Examiner* — Gregory C. Grosso
(74) *Attorney, Agent, or Firm* — John E. Mrozinski, Jr.

(57) ABSTRACT

A flat laminate element made of thermoplastic is hot-formed in a two-stage method. In a first stage, the flat laminate which includes film(s) and/or panels(n) is placed on a flat frame-shaped pallet and is heated to a forming temperature in a heating zone between two flat heat screens in a contactless manner. The edge zone of the hot flat laminate element lies on the pallet such that the laminate piece cannot be clamped in a first laminate direction but rather can be slide on the pallet in this direction. Two non-flat rigid contours which are identical or largely identical act on two
(Continued)

opposing parallel laminate edge sections uniaxially and perpendicularly to the laminate plane and only in the first laminate direction, i.e. monodirectionally, and shape the entire heated laminate element into a monodirectionally molded blank.

9 Claims, 11 Drawing Sheets

Related U.S. Application Data continuation of application No. PCT/EP2017/000367, filed on Mar. 24, 2017.

(51) Int. Cl.

| | | |
|---|---|---|
| *B29C 51/26* | (2006.01) | |
| *B29C 51/30* | (2006.01) | |
| *B29C 51/42* | (2006.01) | |
| *B29C 63/00* | (2006.01) | |
| *B29C 63/02* | (2006.01) | |
| *B29C 51/12* | (2006.01) | |
| *B29C 51/14* | (2006.01) | |
| *B29K 69/00* | (2006.01) | |
| *B29C 63/04* | (2006.01) | |
| *B29C 51/16* | (2006.01) | |
| *B29C 53/04* | (2006.01) | |
| *B29K 33/00* | (2006.01) | |
| *B29K 309/08* | (2006.01) | |
| *B29L 31/30* | (2006.01) | |

(52) U.S. Cl.
CPC ............ *B29C 51/262* (2013.01); *B29C 51/30* (2013.01); *B29C 51/303* (2013.01); *B29C 51/426* (2013.01); *B29C 63/0065* (2013.01); *B29C 63/0073* (2013.01); *B29C 63/02* (2013.01); *B29C 51/16* (2013.01); *B29C 53/04* (2013.01); *B29C 63/04* (2013.01); *B29C 2791/001* (2013.01); *B29C 2791/006* (2013.01); *B29C 2791/007* (2013.01); *B29K 2033/12* (2013.01); *B29K 2069/00* (2013.01); *B29K 2309/08* (2013.01); *B29L 2031/3005* (2013.01)

(58) Field of Classification Search
USPC .......................................................... 264/511
See application file for complete search history.

(56) References Cited

U.S. PATENT DOCUMENTS

| | | |
|---|---|---|
| 5,108,530 A | 4/1992 | Niebling, Jr. et al. |
| 5,785,910 A | 7/1998 | Sakashita et al. |
| 5,895,624 A | 4/1999 | Reece et al. |
| 2008/0017304 A1 | 1/2008 | Sell et al. |
| 2010/0237544 A1* | 9/2010 | Niebling ................. B29C 48/08 264/510 |
| 2011/0052856 A1 | 3/2011 | Berthold |
| 2011/0079933 A1 | 4/2011 | Sheu |
| 2016/0200031 A1 | 7/2016 | van Peer et al. |

FOREIGN PATENT DOCUMENTS

| | | |
|---|---|---|
| DE | 102008050564 A1 | 4/2010 |
| DE | 102009048334 A1 | 4/2011 |
| DE | 102010041179 A1 | 3/2012 |
| DE | 10153035 B4 | 10/2013 |
| EP | 0623449 A1 | 11/1994 |
| GB | 2255524 A | 11/1992 |
| WO | 2011083013 A2 | 7/2011 |

OTHER PUBLICATIONS

Googlepatents machine-translation to English for DE10153035A1 (Dehn, et al., 2003), with foreign patent attached. (Year: 2003).*
International Search Report in PCT/EP2017/000367, dated Jun. 30, 2017, Authorized officer: Caroline Foulger.

* cited by examiner

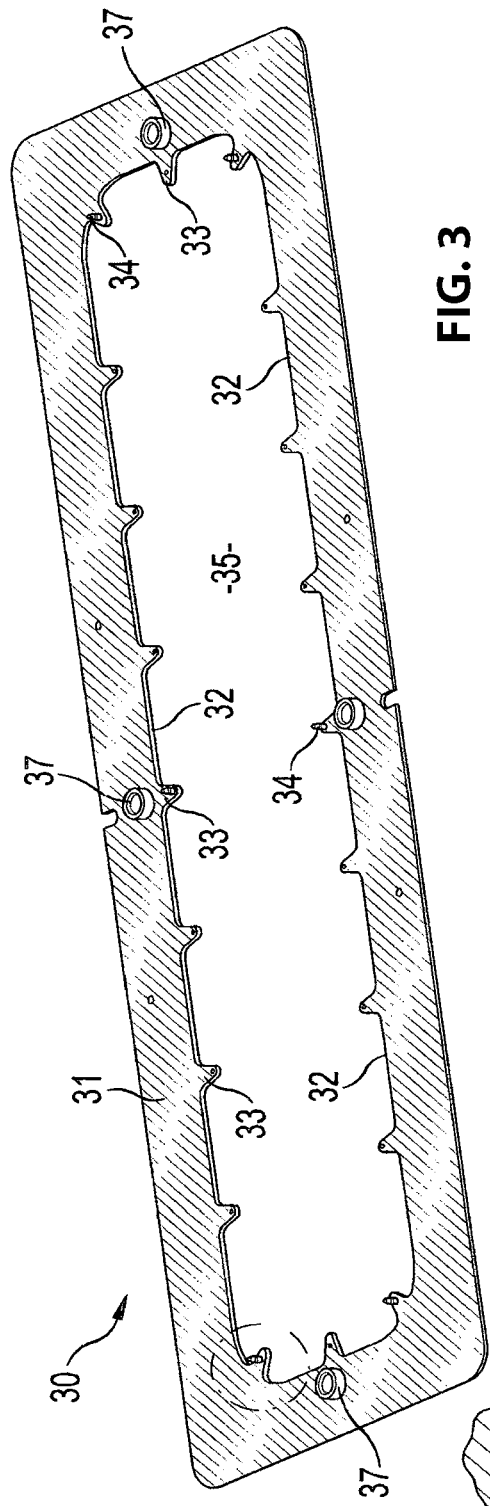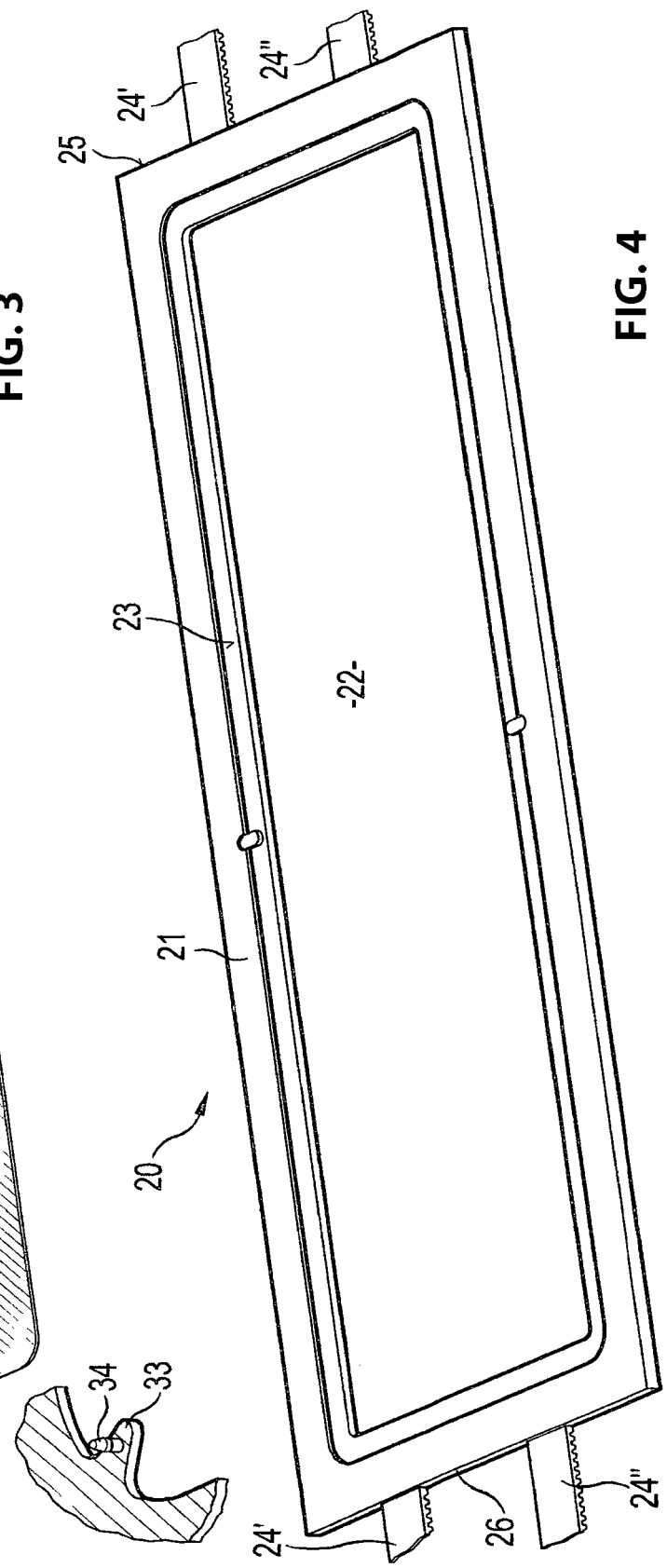

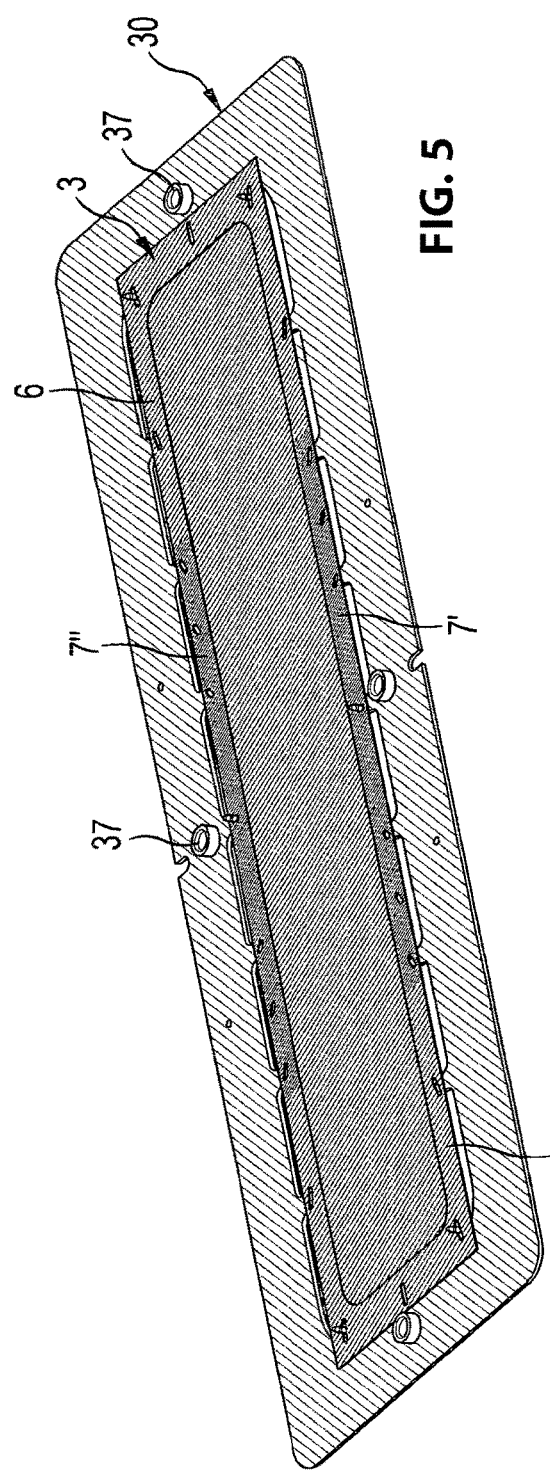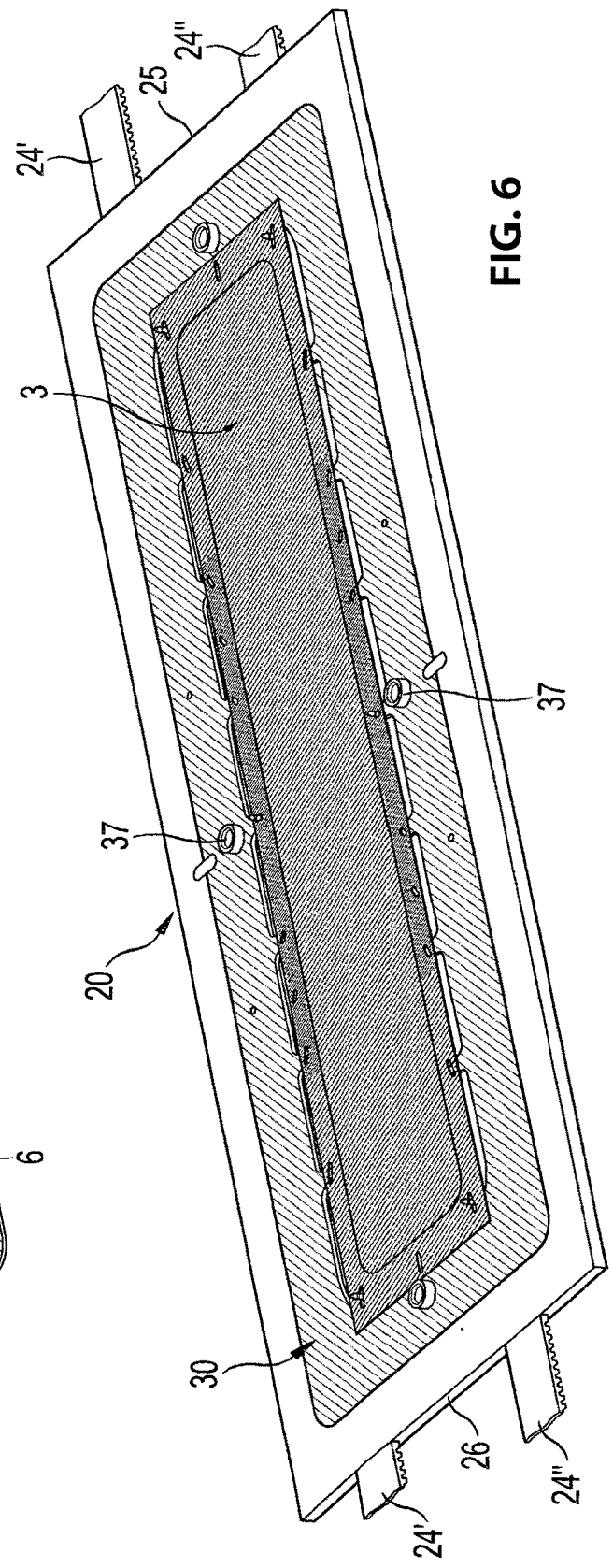

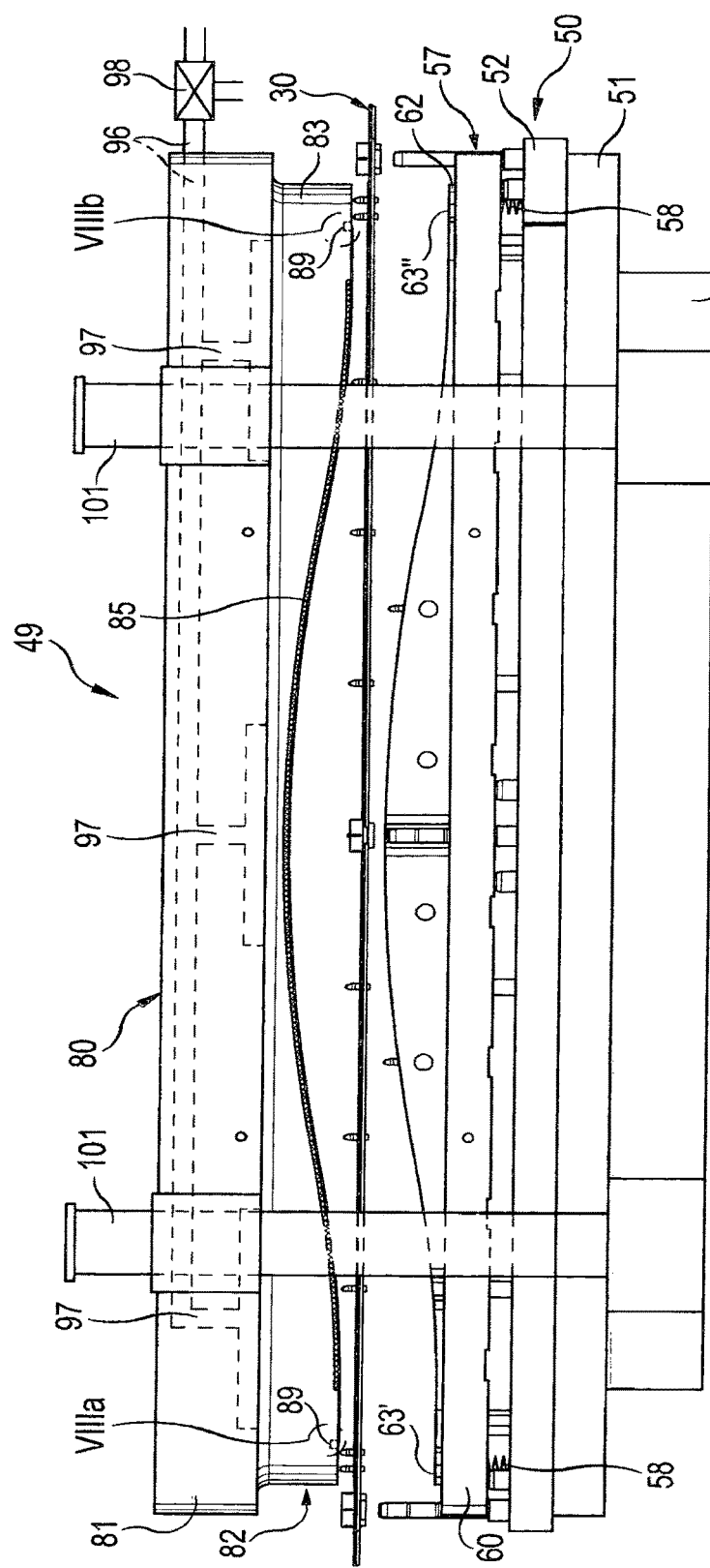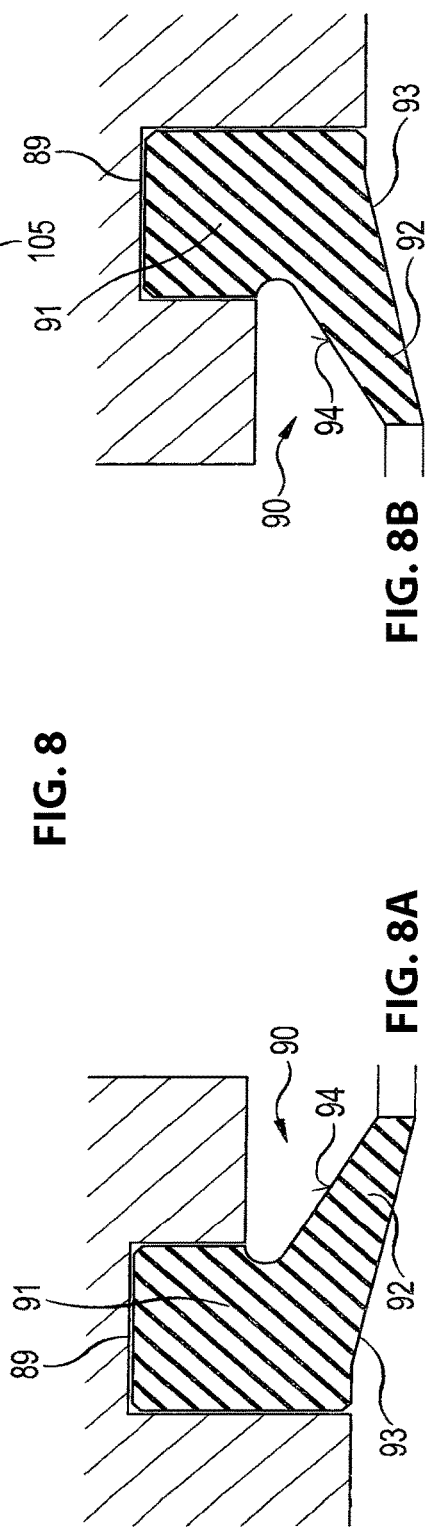
FIG. 8
FIG. 8A
FIG. 8B

METHOD AND FORMING TOOL FOR HOT-FORMING A FLAT THERMOPLASTIC LAMINATE

RELATED APPLICATIONS

This application is divisional of U.S. Ser. No. 16/139,009, which is a national stage application under 35 U.S.C. § 371 of PCT/EP2017/000367, filed Mar. 24, 2017, which claims benefit of German Application No. 10 2016 004 047.5, filed Apr. 4, 2016, all of which are incorporated herein by reference in their entireties.

FIELD OF THE INVENTION

The instant invention relates to a method for hot forming a flat laminate made from a thermoplastic synthetic material. This method facilitates producing 3D-molded components from foils or plates. Furthermore this method can be used for coating a 3D-carrier element with a laminate. The invention also relates to the products produced according to the method. Furthermore, the invention relates to a forming tool for performing the method.

The "3D-formed element" and the "3D-carrier element" designates a solid component or an object or body with a three dimensional surface contour or configuration or geometry. The laminate can be configured with one layer or multiple layers. A typical laminate includes at least a foil and/or plate respectively configured from thermoplastic synthetic material, which can be, for example, polycarbonate PC, poly(meth)acrylate (PMMA), polyester (ME), polyamide (PA), polyarylsulfones (PSU) or polyvinylchloride (PVC).

A foil or plate of this type can be imprinted metalized or coated otherwise, at least in portions of one or plural surfaces which provides a decorative appearance to the 3D-molded component or the coated 3D-carrier element and increases its utility. A multilayer laminate can include an additional laminate in addition to at least one foil and/or plate respectively made from a thermoplastic material.

Products produced according to the method according to the invention are for example used as interior furnishings of motor vehicles, thus, e.g., the dashboard or parts thereof; furthermore, applications and other components of furniture and housings and/or components of other decorative high value consumer products. 3D-molded components made from foil can be back injection molded with another synthetic material. Methods like insert molding, compression molding and other methods of this type provide multilayer, optionally thin wall molded components where a design is arranged within the mass of the molded component and thus protected against abrasion.

Transparent synthetic material plates can be used, for example, for cambered window panes for vehicles including motor vehicles, ships (portholes) and for aircraft, visors for crash helmets, windscreens for motor vehicles, clear covers and fairings for machines and other stable, clear, large surface components with a configuration or camber that protrudes from an original plane.

In more detail the invention relates to a method of the preamble to claim 1.

BACKGROUND OF THE INVENTION

The documents U.S. Pat. No. 5,108,350 A, EP 0 371 425 B1 or DE 38 40 542 C1 disclose a method for producing a deep drawn synthetic material molded component wherein cold stretchable foil material at an operating temperature below a softening temperature of the foil material is indirectly and directly loaded by a liquid pressure medium at a pressure medium pressure greater than 20 bar and isostatically molded within a time period of less than 5 seconds. Advantageously a pressure medium pressure between 50 and 300 bar can be used. A foil that is provided with a color imprint can be advantageously formed at an operating temp between 80° and 130° C. For forming the initially flat foil is applied to a tool by a fluid pressure medium pressed into contact and molded wherein the tool is arranged in a forming station. After the high pressure forming an additional advantageously transparent synthetic resin can be injection molded onto the molded component or deep drawn comp thus obtained. This yields form stable self-supported 3D-formed elements made from thermoplastic synthetic material. This method is designated in the art as "high pressure shaping" or "high pressure molding" of synthetic foils or as maximum pressure forming or cold forming according to the high pressure forming (HPF) or after the inventor as Niebling method.

High pressure forming of plates with thicknesses of 2-18 mm made from thermoplastic synthetic material under HPF conditions is disclosed in the document WO 2015 025285 82 and in the document EP 2 958 733 B1.

Devices for performing the HPF method are described, e.g. in the documents DE 41 13 568 C1 or DE 10 2008 050 564 A1.

The HPF method is characterized by an abrupt forming of the synthetic material foil sing a fluid pressure medium under a pressure medium pressure greater than 20 bar. The resistance of the plastic foil that has not been completely softened yet against the forming is overcome by the high pressure medium pressure. This is the essential difference over thermoforming as described, e.g., in the textbook "Thermoformen in der Praxis" by Peter Schwarzmann, second edition, Carl Hanser Publishing, Munich 2008. When performing thermoforming a resistance of the synthetic material foil against the forming is reduced in that the forming of the foil or of the semi-finished product is performed at or above a softening temperature of the foil or of the semi-finished material. The softened plastic to almost melt liquid foil only poses very little resistance against the forming so that the forming can be performed under vacuum with a pressure differential of 1 bar over ambient, or by compressed air forming under a molder pressure of up to approximately 7.5 bar. Since the compressed air forming is performed at a higher molding pressure than vacuum forming, the compressed air forming is typically performed at a lower forming temperature than the vacuum forming. When performing vacuum forming the foil or the semi-finished product has to be even more plastic even softer and deformable even more easily because a smaller effective molding pressure of approximately 1 bar is provided.

In this book it is stated regarding "Thermoformen au Plattenmaschinenen" on page 105: "The thermoforming method can be broken down into steps, the preforming or pre-stretching and the final forming. Since the wall thickness distribution that is achieved solely by forming with vacuum or compressed air does not suffice, preforming has to be performed. It is a goal of the preforming to achieve a contour which resembles the contour of the finished component as closely as possible. The crisp forming is achieved in the finishing step. In most cases the preforming is more important for wall thickness distribution than the finished forming. The preforming always includes a pre-stretching and can be performed in different ways, e.g., by mechanical pre-stretching by the forming tool itself;
mechanical pre-stretching by an auxiliary plunger;
pneumatic pre-stretching by pre-blowing or vacuum pre-pulling; and
a combination of mechanical or pneumatic pre-stretching.

A corresponding "Negative Forming with Pre-stretching Plunger" is shown on page 114; a bubble is generated by pre-blowing into which a pre-stretching plunger penetrates. A corresponding "Positive-negative forming" is illustrated on page 116; "the preforming is performed by pre-blowing and the formed bubble is subsequently pushed over into a preformed blank by a mechanical plunger, this means into a contour which is sim to the contour of the finished component; thereafter the finished forming is performed under vacuum."

There is no recitation of different or various fixed forming tools or non-flat contours which generate molded components with different contours during a forming method.

An improvement of high pressure forming of synthetic material foils under HPF conditions relates to coating a single layer or multilayer initially flat laminate, like, e.g., a synthetic material foil under high pressure forming conditions to a 3D-carrier element. A method of this generic type is known from the document DE 10 2010 021 892 B4.

The Document DE 101 53 035 B4 relates to a clamping frame. The clamping frame supports mats that are to be molded three dimensionally in particular glass fiber reinforced mats, at a pressing tool which has a forming non-flat contour at a lower tool and a congruent forming, non-flat contour at an upper tool. In order to perform the three dimensional forming an initially flat mat is introduced between the contours and the upper tool is applied to the lower tool wherein the mat is deformed according to the forming contours. The clamping frame is formed by four upper bars at the upper tool and by four lower bars that are arranged parallel to each other at an offset at the lower tool. Each bar is made from an elastic material, e.g., spring steel, and provided with magnets with opposite polarity. After introducing the flat mat between the upper and lower bars pairs of bars that fit together are joined and kept together by a magnetic force. Each pair of bars can be adjusted by lifting devices towards the lower tool with different spacing so that a coarse shaping of the originally flat mat is performed at the forming contour at the lower tool.

The Document DE 10 2010 041 179 A1 relates to a method for producing a blank from a fiber material. Thus a fiber mat is pulled over a clamping frame that includes a first clamping frame element and a second clamping frame element with the fiber mat clamped in between. The clamping frame is arranged between an upper tool and a lower tool of a pressing tool. Closing the pressing tool pulls the fiber mat into a mold cavity of the pressing tool. In particular, the fiber mat is clamped between contact surf of the clamping frame elements which are not flat. The clamping force by which the uneven clamping frame elements clamp the fiber mat is adjusted so that the fiber mat can slide towards the pressing tool when the pressing tool is closed. This is done with the intention to prevent a wrinkling of the blank as far as possible.

The known HPF method is a deep drawing method. Deep drawing, expanding and stretching provide additional surfaces at the 3D-molded comp which are not provided at the originally flat laminate. The surface increase requires material movements which in turn cause layer thickness variations. Quite frequently additional tension surfaces have to be provided at the flat layer material wherein laminate material can migrate to the 3D molded component in order to form the flat laminate. The remaining tension surface residuals have to be removed thereafter, which increases material consumption without providing additional utility. A substantial expansion and stretching damages thin metal conductor paths that are applied to the flat layer material in order to facilitate a conduction of current and/or voltage at the 3D molded component. These and additional findings can be summarized as follows: Deep drawing creates deep drawing stress, which causes damages and other disadvantages at the deep drawn product.

There have been various proposals to reduce or eliminate the deep drawing stress.

The document WO 2011/083013 A2 proposes to reduce the deep drawing stress during deep drawing under HPF conditions in that heating a flat foil element in a heating zone heats one or plural foil portion(s) of the foil element which were heated more before the forming so that these portions are stretched more during the forming (outer portion) and to stretch the portions which were heated less before the forming are stretched less or not at all during the forming (utilized portion), wherein a temperature difference between the utilized portion and the outer portion shall be 10° to 50° C. The different heating between utilized portion and outer portion shall be performed by an appropriate introduction of apertures between the foil and heat radiators in the heating zone. The outer portion is used for tension surfaces and tension surface leftovers that remain after the forming have to be removed which increases material consumption.

Also the document DE 10 2009 048 334 A1 defines a utilized portion and an external scrap portion at the foil piece that is to be formed under HPF conditions. In the external portion one or plural cuts shall be provided that envelope the utilized portion and which cut the foil completely adjacent to the portion to be formed. During the isostatic forming of the flat foil element under HPF conditions these cuts are expanded into gaps that are several millimeters wide. Instead of forming new surfaces by expanding the foil in the utilized portion of the foil element, new surfaces are formed outside of the utilized portion by widening the cuts into pronounced gaps; migrating foil material that has to be transported is replaced by air. The expansion stress of the foil section is the utilized portion of the foil piece shall be significantly reduced.

BRIEF SUMMARY OF THE INVENTION

Thus it is an object of the instant invention to significantly reduce deep drawing stress compared to convention classic HPF methods during hot forming of flat laminate materials made from a thermoplastic syn material under HPF condition, in particular when a significant single axis forming is performed orthogonal to the laminate material plane.

According to the method according to the invention, 3D molded components shall be produced from the originally flat laminate that is made from a thermoplastic synthetic material. Furthermore, a predetermined 3D carrier element shall be coated according to the method with an originally flat laminate that is made from a thermoplastic synthetic material under HPF conditions, wherein deep drawing stress is reduced.

Furthermore, a forming tool shall be provided for performing the method according to the invention.

A first object of the instant invent relates to a method hot forming a laminate made from a thermoplastic synthetic material to produce a 3D formed element or to produce a 3D carrier element that is coated with a laminate material.

Improving upon a method for hot forming a flat laminate element made from a thermoplastic synthetic material into a 3-D formed element or for coating a 3-D carrier element, wherein the flat laminate element is applied to a frame of a frame shaped pallet with a rim zone of the laminate element and heated to a pre-determined temperature, and a form surface of the heated laminate element is loaded within the rim zone with a fluid pressure medium, in particular compressed air, with a pressure medium pressure of 20 bar to 300 bar and formed under constant pressure into the 3-D formed element within a time frame of less than 5 seconds or laminated onto the 3-D carrier element, (isostatic high pressure forming) the solution is characterized in that the flat laminate element is arranged with the rim zone on the frame so that portions of the rim zone of the heated flat laminate element are configured to slide on the frame in a first laminate material direction; and initially two predetermined identical or substantially identical non flat contours impact two laminate material rim portions that are arranged parallel and with an offset from each other and opposite to each other, wherein the non-flat contours impact along an axis orthogonal to a laminate plane and form an entire heated laminate element only in this first laminate material direction, thus mono directionally into a hot mono directionally formed blank; and wherein isostatic high pressure forming is subsequently performed upon the mono directionally formed blank.

As long as two "substantially identical" contours of the flat laminate piece are formed into a mono directionally molded blank this means that the flat laminate piece is formed without stretching or with little stretching. Forming with low stretching is considered a forming which generates a surface increase of less than 4% at the original surface.

A forming method where a forming is only performed in a laminate direction in which the laminate is not clamped for a single axis forming of the flat laminate to the laminate plane of a flat laminate perpendicular to the laminate plane wherein however no simultaneous forming is performed in the orthogonal laminate direction is subsequently designated as "single axis mono direction forming" or typically abbreviated as "mono directional forming." A flat laminate can only be formed in one axis orthogonal to the laminate plane, so that reciting the single axis forming orthogonal to the laminate plane is not mandatory. An essential feature of the instant invention is the mono directional forming of the flat laminate.

With reference to FIG. 1 a mono directional forming and the obtained "mono directionally formed blank" is described further with the features of claim 2.

For example a rectangular flat laminate piece E is processed which has longer sides F in a cartesian coordinate system parallel to the X-axis and shorter sides G parallel to the Y-axis. At this flat laminate piece E an imaginary grid is arranged with parallel straight lines "F1-Fn" that have even spacing from each other which are oriented parallel to the sides "F" and parallel straight lines "G1-GN" that have uniform spacing relative to each other and that are oriented parallel to the sides G. An impact of 2 offset, fixed, identical non-flat contours, thus e.g. a contour that includes a partial circle with a radius r=30 mm. In one axis orthogonal to the X, Y plane, thus in "Z" direction and only in the Z direction, thus mono directionally causes a forming of the flat laminate element E into a mono directionally formed blank V which only has an additional extension in the Z direction wherein the chord that was 50 mm long originally has become a circular arc K with a length of 63 mm so that the mono directionally formed blank V has a length in X direction that is 30 mm less, than the original flat laminate piece E and therefore portions of this originally flat laminate piece have to be able to slide on a surface that supports this laminate piece. A "mono directional forming" is characterized in that and interpreted so that the original straight lines F1-Fn have become cambered lines H1-Hn at the mono directionally formed blank V whereas the original straight lines G1-Gn have been maintained as straight lines G1-Gn with their original lengths. Therefore the mono directional forming of the flat laminate piece E in X-direction has not caused any forming of the flat laminate piece E and displacement of laminate portions in the orthogonal Y-direction.

If the mono directional forming is performed by two offset fixed substantially identical contours a small amount of stretching. A low stretch forming is considered a forming which causes an increase of less than 4% at the original surface.

The instant invention is based on the following idea.

The flat laminate piece has to be heated before forming. A heating of this type is performed simply and quickly in a heating zone, which is formed between 2 heating fields that essentially have identical surfaces, are offset from each other and essentially horizontally oriented and which are provided with heat radiators that generate IR radiation. For example infrared flat radiators or ceramic radiators can be used for this purpose. In a heating zone of this type a flat laminate piece can be heated in a simple, quick and controlled manner. A controlled heating of a cambered or otherwise three dimensionally shaped laminate element would be much more complex consequently the heating provided according to the invention shall be performed upon a flat laminate piece which rests on a flat frame of a carrier, in case of the instant invention on a flat frame of a frame shaped pallet.

Depending on a shape of the 3 D formed element or of the 3 D carrier element to be coated a larger or smaller stretching of the flat laminate element will occur for a one stage forming of the hot, flat laminate element into a 3D formed element of this type or forming the hot flat laminate element onto a 3D carrier element. It was found by the inventors that the hot flat laminate element can be formed into a 3 dimensional blank by a forming that occurs only in one laminate direction, thus a mono directional no stretch or low stretch forming wherein a shape of the three dimensional blank is already very close to a shape of the final product. Molding the flat laminate element into the mono directionally formed blank is performed through an impact of 2 contours that are offset from each other, fixed, identical or substantially identical and non-flat upon 2 parallel offset opposite edge section of the laminate element which is not clamped at its two remote ends in a first laminate direction that is perpendicular to the forming direction and which can therefore slide on its support base.

Thus, it is a core idea of the invention to replace the flat contact surface at a flat pallet from that is required for heating the flat laminate material during the process with a non-flat contact surface contour at the contact surface of a clamping frame or of a spring frame or of a frame structure that is supported and attached at the clamping frame or spring frame and to provide a transfer of the initially flat laminate element from the flat pallet frame to the non-flat contact surface contour. According to the inventors such clamping frames or spring frames or a structure on such clamping frame or spring frame for hot forming flat laminate laminates from thermoplastic synthetic material wherein the clamping or spring frames are respectively provided with 2 parallel offset opposite non-flat contact surface sections which impact 2 parallel offset opposite laminate edge section and thus form the entire laminate piece mono directionally are no known in the art.

Minor stretching can thus occur at the mono directionally formed blank when the shaping mold is raised further relative to the blank that is clamped between the seal surface contour at the upper forming tool half and the congruent contact surface contour at the lower forming tool half and thus penetrates through the blank shape in order to perform a typically minor orienting "mechanical" positive forming at the clamped blank. In this case a "mechanical" forming is performed by an impact of a plunger upon a blank that is previously generated without stretching or with little stretching. This subsequent "mechanical forming" is not among the measures to produce the blank according to the invention.

The bland thus obtained is subsequently subjected to isostatic high pressure forming under HPF conditions. Since the shape of the blank is already substantially or mostly adapted to the three dimensional shape of the 3D formed element to be produced or the 3D carrier element to be coated the subsequent high pressure forming creates a lower stretching of the laminate element compared to direct single stage forming of the flat base material into the three dimensional end product.

Preventing or reducing the stretching of the hot flat laminate during isostatic high pressure forming under HPF conditions has substantial advantages. Stretching causes layer thickness unevenness and expansions which damages surface structures which influence optical and/or haptic perceptions and cause distortions to applied printed images, decorative patterns and designs.

Less stretching avoids these damages and expands applications of the HPF method. According to the invention 3D shaped elements were produce able whose shape includes larger distances from a plane of a starting material compared to what was possible according to the HPF method. For example cambered or spherical 3D shaped elements can be produced by the method according to the invention which are approximately 1 meter long and whose apex line has a maximum distance from the starting plane of 10-15 cm.

Less stretching facilitates applying narrow or thin electrically conductive paths onto the flat laminate element wherein the conductive paths survive mono directional shaping into the mono directionally shaped blank and its shaping under HPF conditions into the 3D shaped element without getting damaged so that light emitting diodes LEDs at the 3D shaped element can be provided with voltage and current by the conductive paths.

Less stretching reduces a requirement for tension surfaces whose residuals would become scrap which yields material savings and the shaping surfaces at an existing shaping tool can be utilized better.

Less stretching requires less heating of the flat starting material which in turn improves imaging crispness of contours and imaging precision of applied printed images, decorative patterns and designs. Another object of the instant invention relates to a forming tool for performing the method.

Another aspect of the invention relates to a forming tool for performing the method according to the invention.

The document DE 10 2008 050 564 A1 discloses a forming tool for high pressure forming a single layer or multi-layer laminate element comprising an upper forming tool half which forms a pressure bell into which a fluid pressure medium, in particular compressed air is introducible at a fluid medium pressure of 20 bar to 300 bar, and which includes a circumferential sealing surface (85) in which a circumferential groove is recessed into which a sealing device is inserted; and comprising a lower forming tool half, which includes a base plate on which a substructure is supported at which a mold with mold contours or a carrier element that is to be laminated and which is provided with 3-D carrier element contours is attached, at which contours the laminate that is loaded with the fluid pressure medium is formed; and the substructure is enveloped by a tension frame supported at the base plate or by a spring frame that is supported on compression springs at the base plate wherein the hot laminate element to be formed is applicable to the tension frame or the spring frame; and the lower forming tool half can assume a release position that is remote from the upper forming tool half and a closing position that is adjacent to the upper forming tool half; wherein in this release position the transport frame with the frame shaped pallet and the hot laminate element placed thereon is insertable between the two forming tool halves and assumes a position in which the tension spring or the spring frame assumes an arrangement within and below the recess at the frame shaped pallet;

in the closing position the hot laminate element maintains a small distance from the sealing surface at the pressure bell and is applicable at this location to the sealing device so that the pressure bell is sealed pressure tight relative to the laminate element; and in this arrangement a fluid pressure medium, in particular compressed air, is introducible at a pressure medium pressure of 20 bar to 300 bar which forms the hot laminate element within a time period of less than 5 seconds isostatically to the form contours or to the 3-D carrier element contours. The improvement of the forming tool according to the invention is characterized in that the tension frame of the spring frame includes a respective contact surface section including a non-flat contour at two parallel offset and opposite frame sections wherein the respective contact surface sections form a non-flat contact surface in combination; or the tension frame or the spring frame includes a frame on which a frame assembly is supported and fixed which includes a respective contact surface section including a non-flat contour at two side walls that are parallel offset from each other and arranged opposite to each other wherein both contact surface sections form a non-flat contact surface contour;

the pressure bell respectively includes a sealing surface section at pressure bell sections that are arranged in parallel with an offset from each other and opposite to each other wherein the respective sealing surface sections include a non-flat contour which form a non-flat sealing surface contour in combination, wherein the non-flat sealing surface contour is configured congruent to the non-flat contact surface contour; and during lifting of the lower forming tool half for reaching the closing position of the forming tool the non-flat contact surface sections reach under two parallel offset and opposing laminate element rim sections at the tension frame, the spring frame or the frame assembly and the non-flat contact surface sections move the laminate element rim sections along and eventually proximal to the sealing surface including the non-flat sealing surface contour of the pressure bell so that the entire hot flat laminate element is formed at the congruent non-flat contours monoaxial along an axis orthogonal to the laminate plane and only in the first laminate material direction thus mono directionally into a blank (W) that is adapted to the contours and formed mono directionally.

The method according to the invention can be performed by a forming tool that includes the entirety of the features described supra.

Advantageous embodiments and improvements of the instant invention can be derived from the dependent claims.

Advantageously it is provided that a stretch free or low stretch forming is performed upon the warm flat laminate element in a first step of the method according to the invention in order to produce a mono directionally formed blank.

A stretching increases a surface of the originally flat laminate element. In the context of the instant invention a "low stretch forming" if a forming which generates a surface increase of less than 4% at the original surface, advantageously of less than 2% and particularly advantageously less than 1%. With a surface increase of less than 1% no layer thickness variations can be found in the end product and distortions of printed images decorative patterns and designs applied to the laminate element are negligible.

Advantageously it is provided in the method according to the invention that the 2 offset fixed, identical or substantially identical non-flat contours are arranged at a contact surface of 2 parallel, offset and opposite frame sections of a clamping frame or spring frame or at a contact surface of 2 parallel, offset and opposite side walls of a frame structure which is supported and attached on a frame of the clamping frame or of the spring frame and this clamping frame or spring frame is lifted relative to the frame shaped pallet on which the hot and flat laminate element rests.

As matter of principle also "negative" mono directional shipping of the flat laminate element can be caused by a contact of non-flat contours which are arranged at a pressure bell when the pressure bell is lowered with respect to the laminate element that is held in place. This method, however, causes a high level of mechanical complexity.

The two non-flat contours that are advantageously arranged at contact surface of the clamping frame or of the spring frame or of the frame shaped super structure are configured identical or substantially identical. "Substantially identical" means that a contact of the flat laminate element at these contours and a subsequent mono directional shaping at these contours can be performed substantially without wrinkling or stretching or essentially without stretching.

"Essentially without stretching" means with little stretching, a "low stretch forming" is defined as forming which creates a surface area increase of less than 4%, advantageously less than 2% and particularly advantageously less than 1% at the original surface.

The non-flat contours which are advantageously arranged at a contact surface of the tension frame or of the spring frame or of the frame shaped super structure can be without being limited thereto; e.g., roof-shaped evenly or unevenly curved or cambered or provided with an apex point or configured wave shaped or upward sloped in several increments. "Uniformly curved" can indicate a circular arc or an elliptic arc, "non-uniformly curved" can be a moderately curved or cambered boundary line which has a single apex point and which transitions at its ends into downward sloped branches which subsequently form patterns for the side surfaces.

The formed surface at the flat laminate element that is provided for an isostatic high pressure forming under HPF conditions is not reduced or impaired by the preceding mono directional forming. The mono directionally formed blank has the same formed surface area as the original flat laminate element.

Advantageously the method according to the invention for hot forming a flat laminate element made from a thermoplastic synthetic material can be performed by the subsequent devices and measures.

In an arrangement including a loading station and unloading station, a forming station, a heating station and optionally a temperature measuring station a rectangular transport frame is provided in the loading and unloading station wherein the transport frame is movable along its two longitudinal sides on a straight rail which runs through an entire arrangement;

a frame shaped pallet is placed on the transport frame wherein a frame of the pallet envelops a recess;

the flat laminate element to be formed is placed in a defined position on the frame shaped pallet, wherein merely a rim zone of the laminate element contacts the frame of the frame shaped pallet;

the transport frame with the frame shaped pallet and the flat laminate element is moved along the two rails from the loading and unloading station through the forming station into the heating station wherein the flat laminate element is heated touch free to a predetermined temperature;

subsequently the transport frame is moved together with the frame shaped pallet and the hot flat laminate element along the two rails from the heating station back into the forming station where the transport frame supported at the two rails is arranged in a defined manner relative to a forming tool, comprising:

an upper forming tool half which forms a pressure bell into which a fluid pressure medium, in particular compressed air is introducible under a high pressure medium pressure and which includes a circumferential sealing surface in which a circumferential groove is recessed into which a sealing device is inserted;

a lower forming tool half including a base plate on which a base is supported at which a mold including mold contours, or a 3-D carrier element is attached that is to be laminated and which includes carrier element contours;

the base is enveloped by a tension frame supported at the base plate or a spring frame supported by compression springs at the base plate, wherein the hot flat laminate element to be formed is place able onto the spring frame;

the lower forming tool half is configured to move into a release position that is remote from the upper forming tool half and a closing position that is adjacent to the upper forming tool half;

in the release position the transport frame with the frame shaped pallet and with the hot flat laminate element is insertable between the two forming tool halves and assumes a position in which the tension frame or the spring frame is arranged within and below the recess at the frame shaped pallet;

in the closing position the hot flat laminate element maintains a small distance from the sealing surface at the pressure bell and is applicable to the seal device at this location, wherein the pressure bell is sealed pressure tight relative to the laminate element; and in this arrangement a fluid pressure medium, in particular compressed air, is introduced into the pressure bell at a pressure medium pressure of 20 bar to 300 bar, wherein the pressure medium forms the hot laminate element within a time period of less than 5 seconds isostatically to the mold contours or to the 3-D carrier element contours;

The method is improved according to the invention in that the flat laminate element contacts the frame of the frame shaped pallet with the rim zone so that portions of the rim zone of the hot flat laminate element are configured to slide on the frame in the first laminate element direction;

the tension frame or the spring frame includes a respective contact surface section at two frame sections that are arranged parallel to each other offset from each other and opposite to each other wherein the contact surface section has a non-flat contour, wherein the two respective contact surface sections together form a non-flat contact surface contour; or the tension frame or the spring frame includes a frame on which a frame assembly is supported and attached which frame assembly includes a contact surface section with a non-flat contour at two side walls that are parallel to each other, offset from each other and arranged opposite to each other wherein both contact surface sections in combination form a non-flat contact surface contour;

the pressure bell respectively includes a sealing surface section at pressure bell sections that are arranged in parallel with an offset from each other and opposite to each other wherein the respective sealing surface sections include a non-flat contour which form a non-flat sealing surface contour in combination, wherein the non-flat sealing surface contour is configured congruent to the non-flat contact surface contour; and during lifting of the lower forming tool half for reaching the closing position of the forming tool the non-flat contact surface sections reach under two parallel offset and opposing laminate element rim sections at the tension frame, the spring frame or the frame assembly and the non-flat contact surface sections move the laminate element rim sections along and eventually proximal to the sealing surface including the non-flat sealing surface contour of the pressure bell so that the entire hot flat laminate element 3 is formed at the congruent non-flat contours monoaxial along an axis orthogonal to the laminate plane and only in the first laminate material direction thus mono directionally into a blank that is adapted to the contours and formed mono directionally.

Thereafter the fluid pressure medium is introduced into the pressure bell under a high pressure medium pressure which forms the intermediary hot blank isostatic ally according to the mold contours or the carrier element contours. Thereafter the pressure bell is ventilated and the forming tool is opened. In particular in case of form element contours or 3D carrier element contours with a pronounced geometry the upper forming tool half can be subsequently raised by certain distance in order to increase an intermediary space between the sealing surface and the transport frame, so that the transport frame with the frame shaped pallet on which the formed 3D formed element or the coated 3D carrier element is arranged can move out of the forming station into the placement and extraction station.

This method facilitates producing 3D formed elements which have a rather large extension relative to a plane of the originally flat laminate while still being substantially free from layer thickness variations. Furthermore, 3D carrier elements that are coated with a laminate can be produced according to the method which have a void free high quality surface that is optically perfect.

It is furthermore provided that the clamping frame or the spring frame has a frame with a boundary zone and the boundary zone reaches under the bottom side of the frame shaped pallet at its inner circumference during the lifting movement of the lower forming tool half, lifts the pallet with the laminate piece arranged thereon by some distance and thus separates it from the transport frame that is held in place. This preform blank still rests on the frame of the frame shaped pallet with its flat end sections that extend in the first laminate direction and the frame forms a device to move the flat end sections towards the flat sections of the sealing surface and to seal them pressure tight relative to the sealing surface. Also the product formed according to isostatic high pressure forming remains on this frame with its flat end sections. The frame shaped pallet which supports the product is lowered onto the transport frame that is held in place and the transport frame together with the pallet and the product arranged thereon can be moved from the forming station into the loading and unloading station.

In case of 3D formed elements being manufactured or coated 3D carrier elements being manufactured that respectively have a pronounced geometry which substantially differs from the original laminate plane it can be advantageously additionally provided that after completion of isostatic high pressure forming and ventilating the pressure bell the frame shaped pallet on which the formed element or the laminated 3-D carrier element is arranged is lowerable relative to the upper forming tool half and place able onto the transport frame that is fixed in place; and thereafter the upper forming tool half is liftable by a predetermined amount in order to render the transport frame with the 3-D formed element placed thereon or the coated 3-D carrier element removable without interference from the forming zone and movable into the loading and unloading station.

Thus, also products with a pronounced geometry can be retrieved from a forming tool that is in its extended retrieval position.

Depending on a size of the surface to be formed at the laminate element various seal devices can be provided in the groove at the sealing surface of the pressure bell. In case of a molded surface is less than 800 cm$^2$ at the laminate element to be hot formed no larger cambered changes will typically occur at the cavity of the pressure bell when loaded with the high pressure fluid so that a typical O-ring made from an elastic circular thread with a diameter of approximately 3 mm to 6 mm will suffice. In order to implement a mold surface of at least 800 cm$^2$ the press and the pressure bell have to be maximum pressure medium pressure of 300 BAR at least for a mold closing force of 2.4 Mega Newton. The press and the pressure bell yield under these tremendous forces and certain bending and warping can occur which would drive a circular thread that is more than 100 cm long out of its groove in order to still assure a pressure tight sealing of the pressure bell a more effective pressure medium has to be used under these more severe conditions.

In this case the sealing device at the sealing surface of the pressure bell is a strand shaped profile seal which includes a body that is inserted into a groove at a sealing surface, wherein an elastic seal lip protrudes from the body which seal lip includes an outer seal lip flank and an inner seal lip flank;

in a closing position of the forming tool the contact surface maintains a distance at the lower forming tool half from the seal surface at the upper forming tool half, wherein the distance has a dimension:
[thickness of the laminate element to be formed plus (100 μm to 1200 μm)]
so that a gap between the non-flat contact surface and the non-flat seal surface is formed; and
the pressure fluid flowing under a high pressure fluid pressure into the pressure bell impacts an inner seal lip flank and deforms the elastic seal lip so that the seal lip bridges a gap and seals the rim zone at the mono directionally formed blank pressure tight relative to the seal surface at the pressure bell.

This distance assures that the laminate element can slide in the gap between the strand shaped profile seal at the sealing surface of the upper forming tool half and the lower forming tool half for a mono directional forming on the non-flat contours of the contact surface. Furthermore the heavy massive components of the 2 forming tool halves do not contact each other in the closing position either so that damaging or comparing these components can be safely avoided.

The method according to the invention performs hot forming a laminate made from a thermoplastic synthetic material. Suitable synthetic materials are advantageously in particular:
polycarbonate (PC) or copolycarbonate based on diphenols in particular also based on bisphenol A and modified bisphenol compounds;
poly- or copolyacrylate;
poly or copolymethacrylate, in particular polymethylmethacrylate or poly (meth) acrylate (PMMA);
poly or copolymers with styrol, thus in particular also impact resistant polystyrol, polystyrolacrylnitril (SAN) and acrylnitril-butadien-styrol-terpolymers (ABS);
thermoplastic polyurethanes (TPU) as a binder in multilayer arrangements;
polysulfones, in particular polyphenylsulfones and polyarylsulfones (PSU);
polyester (PE), thus in particular poly or copolycondensates of terephthal acid including poly or copolyethylenterephthalate [PET or CoPET, glycol-modified PET (PETG)], and poly- or copolybutylenterephthalate (PBT or CpPBT);
polyamide (PA);
polypropylene (PP);
polyvinylchloride (PVC); and
mixes or blends from the preceding materials.

These synthetic materials are typically used in a transparent form.

The laminate according to the invention can be provided as a one layer synthetic material foil or as a multi-layer composite including at least two synthetic material foils wherein each synthetic material foil has a layer thickness of 50 μm to 1000 μm, in particular a layer thickness of 200 μm to 750 μm.

The laminate according to the invention can include a one layer synthetic material plate which has a layer thickness of 1000 μm to 10,000 μm, in particular a layer thickness of 3000 μm to 10,000 μm or is provided as a multi-layer composite including one or plural synthetic material plates and is optionally used together with one or plural synthetic material foils, wherein a total layer thickness of the composite does not exceed 12,000 μm.

The recited laminates are subsequently abbreviated as single layer or multilayer laminates.

The single layer or multilayer laminates can be placed one layer or multi-layer laminates are used which are at least partially imprinted or metalized on one surface or on both surfaces and/or which are coated in another manner or in case of a multi-layer laminate material an imprint or metallization or other coating can also be provided as a sandwich between two layers from transparent plastic materials. An imprint metallization or other coating delivers an attractive design or attractive decorative pattern.

According to the invention the laminate made from a thermoplastic synthetic material is heated by radiation heating before forming touch free so that at least one side of an entire molding surface or a major portion of the molding surface of the laminate element to be formed has a surface temperature in a range of [VST (=VICAT softening temperature) B50 (° C.) of the synthetic material−20° C.] up to [VST B50 (° C.) of the plastic material plus 23° C.].

These softening temperatures are significantly below the forming temperatures recommended for thermo forming (c.f. "Thermoformen in der Praxis" by Peter Schwarzmann, second edition, Carl Hanser Verlag, Munich 2008, page 40). Which facilitates a better choice of temperature sensitive coatings and a gentler treatment of these coatings.

In particular for hot forming plates made from glass clear transparent thermoplastic synthetic material the flat laminate element is made from a plate made from a thermoplastic synthetic material with a layer thickness of 3000 μm to 10,000 μm;
the plate is heated in a heating station for a time period between an upper heating field and a lower heating field of a heating device wherein each heating field includes a heating shield which includes a plurality of individually controllable infrared surface heaters;
the two heating shields are maintained at an average surface temperature between approximately 120° C. above VST 50B (° C.) of the respective synthetic material; and
the plate to be heated that is introduced between the heating shields at ambient temperature is maintained between the heating shields for a dwelling time that is a function of plate thickness and computed as follows [(numerical value of plate thickness in mm)×23 seconds+z (sec)] in order to heat the plate to the forming temperature; z has a value of 3 to 60.

Self-supported form stable 3D-form elements with a high shaping precision, with perfect glass clarity and a high level of brilliance and a high level of optical surface quality can be obtained.

The method according to the invention for hot forming a one-layer or multi-layer laminate from thermoplastic synthetic material is used for producing a 3D-form element.

Furthermore, this method can be used for producing 3D-carrier elements that are coated with a single-layer or a multi-layer laminate. The laminate adheres to the 3D-carrier element through a glue.

When producing a 3D-carrier element of this type, it can be advantageously provided that
a blank made from the laminate that is adapted to the 3-D carrier element is placed on a transfer foil;
at least a rim zone of this transfer foil is placed on the frame of a frame shaped pallet;
the transfer foil and the laminate material blank are jointly formed into the mono-directional blank through mono-directional forming;
only the transfer foil thus formed is clamped between the contact surface at the lower form tool half and the sealing surface at the upper form tool half; and when loaded with the high pressure fluid the pressure fluid impacts the transfer foil and forms the transfer foil together with the laminate blank wherein the laminate material blank contacting the transfer foil is applied and laminated to the 3D-carrier element by an adhesive layer.

This method variation facilitates saving a typically rather expensive layer material, e.g., when structure foils or foils that are provided with particularly embossed structures (so called "Opto 4D-Foils") are being used.

It is furthermore advantageously provided that the flat laminate element to be formed is placed on a flat frame shaped pallet whose frame is provided at its inner circumference with a number of offset inward extending protrusions and the rim zone of the laminate element is only placed onto the protrusions.

It is furthermore provided that the tension frame or the spring frame or the side surfaces of the frame assembly supported and fixed on the frame of the spring frame
- include a structured outer circumference and a non-flat contact surface with inward extending recesses and outward extending bars at the outer circumference;
- the outer circumference is adapted to the inner circumference at the frame of the frame shaped pallet so that the clamping frame or the spring frame or the frame assembly is movable at a closed distance from the inner circumference of the pallet frame relative to the pallet that is fixed in place;
- the protrusions at the inner circumference of the pallet frame engage recesses at the outer circumference of the tension frame or of the spring frame or of the frame assembly;
- the protruding bars at the outer circumference at the tension frame or the spring frame or the frame assembly engage the intermediary spaces between two respective adjacent protrusions at the pallet frame; and
- when lifting the tension frame or the spring frame or the frame assembly relative to the pallet that is fixed in place the protruding bars at the outer circumference of the tension frame or the spring frame or the frame assembly reach below the rim sections of the flat laminate element and move them along so that they deposit the laminate element on the contact surface at the tension frame or at the spring frame or at the frame assembly,
- so that during an additional lifting of the tension frame or of the spring frame or of the frame shaped super structure with respect to the fixated upper forming tool half the laminate element is formed mono directionally into a mono directionally formed blank between the non-flat contact surface contour (68) and the congruent non-flat sealing surface contour.

Thus, an essential idea of the invention is implemented where the flat contact surface at the flat pallet frame is replaced with the non-flat contact surface contour at the contact surface of the clamping frame of the spring frame or of the frame shaped structure. Thus the shaping surface that is available for shaping is maintained in its entirety at the flat laminate element.

In this embody of the palette frame it is advantageously provided that vertically protruding mandrels are attached at the protrusions at the inner circumference of the pallet frame which protrusions engage boreholes or slotted holes that are recessed in the edge zone of the laminate element so that portions of the edge zone can slide on the frame of the frame-shaped palette. Slotted holes of this type extend in the first laminate direction and have a sufficient length as a function of position and arrangement at the laminate element so that the laminate element can slide on its supporting base surface unimpeded and without stretching.

Using the mandrels the predetermined defined arrangement of the laminate element to be formed can be secured on the one hand side relative to the frame shaped pallet and on the other hand side relative to the forming tool. 3D-formed elements can be obtained whose imprint and/or design corresponds exactly to a predetermined reference sample.

A flat, single- or multi-layer laminate made from thermoplastic synthetic material is formed at an elevated predetermined temperature in a two-stage method into a three-dimensional (3D) structure; thus the hot, flat laminate is formed in a first step into a monodirectionally formed blank which is subsequently formed in a second step under HPF-conditions (=high pressure forming) into a finished 3D-product.

Suitable advantageous thermoplastic synthetic material for the flat base material are provided in claim 10. Further details regarding suitable thermoplastic materials are provided in the prior art, e.g., in the documents DE 103 27 435 A1, DE 2006 031 315 A1, and EP 2 197 656 B1, thus in paragraph [0023] through [0066]; which are incorporated by reference in order to avoid unnecessary repetition.

For many applications glass clear 3D-form elements or with transparent sections are required. For these applications thermoplastic or optically transparent synthetic materials are being used like, e.g., polycarbonate (PC), polymethylmethyacrylate (PMMA), polythylenterephthalate (PET), polyphenylsulfon (PPSU) or polystyrol (PS) and modified materials of this type.

Single layer laminates can be foils or plates made from the plastic materials. Foils typically have a layer thickness 50 µm to 1000 µm, advantageously 200 µm to 750 µm. Foils with layer thickness of this type are used quite frequently. For forming 3D-form elements obtained from these foils can be back injection molded with additional plastic material in order to obtain form stable, self-supported finished products.

Plates typically have layer thicknesses of 1000 µm to 10,000 µm, advantageously layer thicknesses of 3000 to 8000 µm and particularly advantageously layer thicknesses of 4000 to 6000 µm. 3D-formed elements produced from such plates are typically not back injection molded with additional material or otherwise reinforced. Therefore, the plate thickness together with the other material properties have to assure mechanical stability, durability, strength and load bearing capability which are required for the application of the 3D-form element. For many applications, e.g., as a cambered plastic pane for motor vehicles or protective screens for machine enclosures, a plate thickness of 4000 to 6000 µm is completely sufficient.

For a multilayer laminate from thermoplastic synthetic material an interconnection from the preceding synthetic material foils or an interconnection from the plates and foils recited supra is suitable. The entire layer thickness of the interconnection shall not exceed 12,000 µm. An interconnection made from two or more foils or from two plates can be obtained by co-extrusion or by gluing with a glue. Suitable glues, for example, are thermoplastic polyurethanes (TPU).

A multilayer laminate can include one or plural layers of a material other than foils and/or plates from a thermoplastic synthetic material. Without being limited thereto, other additional layer materials like, e.g., metal foils, wood veneer foils, on particular burlwood veneers, leather, artificial leather, like, e.g. ALCANTARA (ALCANTARA® is a registered trademark); furthermore, textile materials like woven materials and knitted materials and laid materials from natural fibers and/or synthetic fibers. Thus, a multitude of decorative effects can be obtained, like, e.g., a high-end piano lacquer look on select tropical wood veneers like, e.g., burlwood. An interconnection is obtained which includes at least one layer of laminate made from a thermoplastic synthetic material and at least one additional layer made from another laminate material.

Commercially available 3D-formed elements that are produced according to the invention are typically provided with a graphical, functional and/or decorative configuration that follows a predetermined layout which is typically applied as a background on a backside of a transparent foil or plate, e.g., as an imprint, metallization and/or other coating, and which is visible through the foil layer. Thus, advantageously transparent foil and plate materials are being used. A transparent layer can also be provided with a matte surface or a matte lacquer layer in order to imprint, metallize and/or other coat the opposite surface. Alternatively the decorative effect can be provided by a layer of a multilayer laminate or composite material which is modified or reinforced by one or plural transparent foil layers. For example, the decorative effect can be provided by a metal foil or a burlwood veneer or by an artificial veneer made from a synthetic material, and the decorative effect can be modified and reinforced by transparent foils in order to achieve particular gloss effects, for example, a piano lacquer optical appearance by foil application as discussed, e.g., in the document DE 10 2007 054 579 A1. All of these decorative configurations increase the utility of a 3D-form element or 3D-carrier element configured therewith.

Among the elements of a decorative configuration are e.g. numbers, lettering symbols images, pictograms and similar which are applied to a surface of an initially flat foil or plate. This can be done for example in a multi-stage silk screening method and/or by applying a coating which is applied in plural sequential steps respectively in a liquid layer. For this alternative application for example offset printing Gravure printing or digital printing are suitable. Advantageously an imprinting that follows a predetermined lay out is applied by silk screening. In a multistage silk screening process typically a black color layer is applied initially at which the subsequently visible elements like numbers, lettering, symbols, images, pictograms and similar are recessed in a negative print. In subsequent printing steps these recess spots are back filled with color layers in various tones. In order to apply the color layers typically colored lacquers are used that are based on polycarbonate or polyester urethane. High temperature resistant flexible printing colors for imprinting synthetic material foils which explicitly tolerate the conditions of the instant HPF-method and optionally a subsequent insert molding are described e. g. In the document DE 198 32 570 C2. The document De 101 51 281 A1 describes colored lacquers which are particularly well adapted for silk screening. PMMA foils and the subsequent forming on the HPF conditions. Liquid silk screening colors that are particularly well suited for this application are sold e.g. by PROELL KG, 91781 Weissenburg, Germany. Highly cross linked UV hardening silk screening colors sold by Marabu GmbH & Co. KG, 71732 Tamm, Germany are also well suited and reduce or prevent the complexity that is required for drying and completely removing organic solvents.

In the context of the instant invention special laminates can be used and formed. For example the laminate itself can be made from a structured foil or a multilayer laminate can be used whose visible cover layer is made from a structured foil. Structured foils have a structured surface which is formed by protrusions and recesses with respect to a flat nominal surface. Structures of this type can imitate a natural original, for example the grain of natural leather or the wood grain at a wood surface. Using respective contour data facilitates processing a surface of an embossing roller or the tool surface of a positive or negative tool. Furthermore synthetic structures can be generated according to predetermined CAD data. By forming or embossing the structure of the embossing roller or of the embossing tool surface is transferred to a surface of a synthetic material foil. Details for producing accordingly structured pressing tools can be derived e.g. from the document DE 198 55 962 C5 and the literature cited therein. An exemplary structured foil is sold by Exel GmbH, 83101, Rohrdorf, Germany under the model number PMU 4060 UV. This foil is made from a blend made from thermos plastic polyurethane and poly meth acrylate and has a waviness of 3 mm at the most. The structured foil can be obtained and used transparent or colored, e.g. colored pitch black.

Other high value embossing foils suitable as layered material are sold by Isosport Verbundbauteile GmbH, 7000, Eisenstadt, Austria with the designation "up to 4D foils". A precisely matched embossing on both side of a transparent PA 12 foil creates a foil with a unique optical depth effect (lenticular effect) which has excellent material properties including excellent scratch resistance and high UV resistance and good weather resistance which makes these foils also suitable for external applications. Due to its high heat resistance embossing foils of this type can be formed under the conditions according to the invention, wherein a stretch free forming that is possible according to the invention does not damage or impair the particular embossing structures.

Recently various diffusor foils, reflector foils or light directly foils or light decoupling foils have been developed for LED light conducting technology. Typically these are foils based on poly carbonate with a high content of special ultrapure light scatter particles and with a special structure that is embossed onto the foil surface. For LEDs light emitting diodes organic and organic systems OLED can be used. The foil is typically glued onto a glass surface at the LED housing. Special foils of this type for light conduction technology are sold e.g. by Covestro Deutschland AG, 41536, Dormagen, Germany. Under the designations Makrofol LM 327 (a light control foil or Makrofol TP 228 (a light decoupling foil). Makrofol® is a registered trademark. Light controlling, light distributing and/or light decoupling foils are imprint able and deformable according to the HPF method into 3 D shaped elements without impairing the special surface structure. Also special foils of this type for light conduction technology can be used as a flat laminate material for hot forming according to the invention.

Thicker metal layers or metallizations that are applied to laminate materials that are used according to the invention can also be applied by a printing method. Thinner metal layers with layer thicknesses of 5-250 nm, in particular with layer thicknesses of 15-60 nm which provide metallic shine on the one hand side and which are light permeable on the other hand side can be applied by physical vapor deposition (PVD) or chemical vapor deposition (CVD). Superfluous metal layer sections that are not required for certain graphical or decorative patterns can be removed by laser treatment.

Suitable metals are e. g. aluminum, titanium, chromium, copper molybdenum, indium and iridium and metal alloys like e.g. indium, tin alloys or copper alloys, advantageously indium, tin alloys, particularly advantageously indium, copper, tin alloys as described in e.g in the document US 2008/0020210. Furthermore at least one additional layer made from or plural electro luminescent compounds can be applied to the metal layers. Electro luminescent compounds of this type are known to a person skilled in the art e.g. from the document EP 1 647399 A1. In order to produce electrically conductive paths pastes that include silver particles can be applied or the metalizing recited supra can be performed. LEDs (light emitting diodes) that are integrated into the 3d formed element can be connected to the conductive paths. Furthermore also transparent sections can remain at the flat laminate element that is to be formed wherein the liquid crystal display becomes visible later on in the transparent sections.

On other surfaces that are arranged opposite to the color layers typically a clear structured lacquer is applied which provides a mat non-reflecting surface to the finished product. After the 3D formed element is arranged to perform its function the structure lacquer layer will be arranged at a front side of the form element and the color layers of the graphic design will be at a back side of the formed element depending on a viewing direction of a user.

Flat foils and plates made from the thermoplastic synthetic materials recited supra can be provided with a coating that is applied by co extrusion which provides particular properties and functions, among are absorbs ion of UV radiation, color change, and/or darker colorations using photo chromic substance sunder an impact of sunlight, scratch resistant coatings with a dirt repelling function and "anti-gravity effect" c.f. DE 10 2005 009 209 A1 (water absorbing coatings in order to delay/reduce water secretion in a humid environment "anti-fog" and other known functions. Typically coatings of this type have a layer thickness of less than 50 µm.

Coatings can be subsequently applied to foils in plates made from thermoplastic synthetic materials that have already been produced, in particular one or plural protective layers. In particular for poly carbonate it is well known that it is not inherently UV stable by itself. Bisphenol A polycarbonate has maximum UV sensitivity between 320 nm and 330 nm. Below 300 nm no sun radiation reaches earth and above 350 nm the polycarbonate is insensitive so that no yellow discoloration occurs. Therefore sufficient UV protection is desirable for a 3D formed element that is intended for long term outdoor applications. Additionally am improvement of abrasion resistance, weather resistance and general utility of PC surfaces is desirable.

For this purpose a scratch resistant coating can be applied in an adhesion and primer layer onto existing foils and plates which also provides UV protection. A production of a respective products is described e.g. in the document DE 10 2009 020 934 A1. Accordingly a coating of this type can be applied to substrates made from polycarbonate, polyester carbonate, polyester poly phenyl ether, poly acrylate and poly methacrylate. Corresponding semi-finished products made from PC with a scratch resistant coating or hard coating of this type are commercially available e.g. from Covestro Deutschland AG, 41538, Dormagen, Germany under the trade name Makrofol TP 278 and by MacDermid Autotype Ltd., Wantage UK under the trade name XtraForm®.

A semi-finished product is commercially available that is provided with a protected foil and which only reaches its final properties after a single stage or 2 stage UV curing process. The semi-finished produce is can be deep drawn as a matter of principle. Typically however a semi-finished product of this type is damaged during thermoforming due to the required forming temperature of 160° C. or higher so that such substrates that are provided with a UV curable scratch resistant coating are not formable under thermoforming conditions. By comparison semi-finished products of this type can be formed into attractive 3D formed elements by the method according to the invention since lower forming temperatures are being used and because the 2 stage forming facilitates an attractive shape with substantially curved or cambered surfaces. Only after the forming is finished a single stage or 2 stage UV hardening is performed.

3D formed elements made from polycarbonate are well suited for exterior applications and for an application as interior furnishings in motor vehicles.

The two stage forming according to the invention of a flat warm laminate can also be used for coating a 3D carrier element. All objects are suitable as 3D carrier elements which have a 3 dimensionally configured sleeve or shell whose surface shall be coated with a firmly adhering laminate. Typically the sleeve or shell is supported at a support structure which subsequently also provides mounting and attachment of the coated product at its location of use. Substrates and/or carrier elements of this type can be made of metal for example light metal like aluminum, magnesium or other alloys, synthetic material like e.g. a thermos plastic synthetic material that is injection moldable like e.g. polyamide PA, acryl nitril butadiene styrol terpolymer (ABS) acrylester styrol acrylnitril (PA) acrylnitril terpolymer (ASA) polyoxymethylene (POM) polyvinylchloride (PVC) or polyarylsulfones (PSU), furthermore from wood and other stable and durable materials. For an application as interior furnishings in motor vehicles 3D carrier elements of this type including their support structure are typically fabricated in advance as integral one piece injection molded pars and are typically made from synthetic materials like e.g. PA, ABS, ASA, POM, PVC, or PSU.

In order for a provided layer material to reliably and permanently adhere to the coated 3D carrier element the layer material has to be tied to the 3D carrier element by a glue layer. A glue layer of this type facilitates using laminates with a high reset force, forming of the laminate into small curvature radii and a safe and reliable attachment of the laminate material edges at the 3D carrier element, in particular also at its undercuts.

According to the invention a 3D carrier element can be coated with a laminate wherein a two stage forming of the originally flat laminate material is performed wherein an alternative method variant is possible in which a blank made from a flat laminate material is placed on a transfer foil and the transfer foil and the laminate blank are jointly formed in to stages c.f. also claim 19. Only the transfer foil is clamped in a manner that separates the two forming tool halves pressure tight from each other between the contact surface at the lower forming tool half and the sealing surface at the upper forming tool half. When loaded with the fluid pressure medium under a pressure medium pressure of 20 BAR to 300 BAR the pressure fluid impacts the transfer foil and the laminate blank supported by the transfer foil is pressed against the 3D carrier element and molded. Blanks of this type can advantageously include layers made from metal, wood, for example burl wood veneer, leather, artificial leather or textile materials like e.g. woven and knitted materials and non-woven fabrics and similar in addition to a layer or plural layers made from a thermo plastic synthetic material foil. The blank can have a size that is adapted to the 3D carrier element and does not have to fill the entire cross section of the pressure bell. An undesirable deposition of laminate material on or at forming tool elements can be limited. The transfer foil serves as a carrier for the laminate.

The transfer foil can be made from a highly elastic foil material which provides a surface increase by stretching during isostatic high pressure forming which are required for final forming of the laminate blank at the 3D carrier element. Expansion, stretching and other loading of the laminate blank can be reduced even further or substantially prevented. Typically a forming of the laminate blank without stretching can be provided. Transfer foils made from polyolefin, like e.g. polyethylene thus in particular LDPE, or polypropylene respectively with layer thicknesses of approximately 80-500 μm or transfer foils made from thermoplastic polyurethane TPU, thus e.g. DESMOPAN foils distributed by DESMO-PAN®) are well suitable and being advantageously used. After completion a transfer foil of this type can be removed from the coated product or can remain on the surface of the laminate as an additional surface protection. The blank is typically supported at the transfer foil by a contact glue which can be removed without residuals from the visible side of the laminate. Suitable contact glues are well known and commercially available. A good adhesion of the blank at the transfer foil transfers a portion of the extension of the transfer foil that occurs during the forming of the transfer foil to the laminate blank and thus prevents undesirable wrinkling of the blank.

Glue systems and glue compounds for generating a glue interconnection between the laminate blank and the 3D carrier element are well known to a person skilled in the art which can select from a plethora of suitable commercial products.

A method is advantageous in which a one component glue compound is applied only to the contact side of the laminate. Furthermore the glue layer that is only arranged on the contact side of the laminate shall be provided initially in a non-active condition which facilitates storage and handling. Through a controlled activation treatment the initially non-active glue layer shall be transferred into an active condition in which the gluing process is then started. An advantageous activation treatment is the heating of the glue compound to its activation temperature. In this case thermally activate able glue compounds or hot melt glues are being used. An alternative or additional activation treatment is irradiation with actinic radiation in particular UV radiation. In this case UV hardening glues are being used. In order to activate the UV hardening glues additional UV radiators have to be provided in the heating zone.

The application can be performed e.g. in that a solution, with an activate able glue compound is applied through a silk screening method on a contact side of the laminate material. Subsequently the solvent is removed by evaporation and drying. A thin even dry layer made from glue compound can be obtained which is typically only applied where gluing force is required. Alternatively, an activate able glue compound can be picked directly from a silicone release paper as a dry layer and transferred, e.g. in that laminate material and release paper provided with the activate able glue compound are jointly run through a calendar roller gap. Furthermore accordingly selected powder glues can be applied by extrusion coating, e.g. by hot extrusion or powder coating or by another direct coating. Various thermally activate able melt glues are also available as melt glue foils or non-woven materials and can be applied to the contact side of the laminate in this form, for example in a desired shape and size. Thermally activate able glue compounds, melt glues and hot melt glues are known to a person skilled in the art who can select from many commercially available products, subsequently exemplary recipes are recited.

A thermally activate able glue compound can include an elastomeric base polymer and a modification resin as essential components, wherein the modification resin includes a glue resin and/or a reactive resin. The elastomeric base polymer can be a thermoplastic polyurethane or a mix of powdery polyurethane forming components like aromatic diisocyanaten and polyester polyols with a high content end hydroxyl groups. Thermoplastic polyurethane with a high content of end hydroxyl groups provide a particularly high glue strength on various substrate. An alternative, thermally activate able glue compound can include:

50-95% by weight of a glue able polymer, and
5-50% of an epoxy resin and a mix of plural epoxy resins;
Wherein the glue able polymer includes acrylic acid compounds and/or methyl acryl compounds and one or plural co polymerize able vinyl monomers.

Another thermally activate able glue compound can include:

40-98% by weight acrylic containing block polymer;
2-50% by weight of 1 or plural tackifying epoxy resins, and/or nova lack resins and/or phenolic resins; and
0-10% hardener for cross linking the epoxy resins and/or the nova lack resins and/or the phenolic resins.

In order to provide optimum cross linking suitable initiators and/or cross linkers can be added to the glue compound, e.g. IR radiation absorbing photo initiators and/or UV light absorbing photo initiators. Additionally adhesion enhancing compounds, e.g. so called primers can be provided. For primers so called not seal glues based on polymers like e.g. ethyl vinyl acetate, and functionalized ethyl vinyl acetates and also reactive polymers can be used.

Thermally activate able glue compounds of this type can be produced and adjusted so that an activation temperature in a range of 60-140° C.°, further advantageously an activation temperature of 75 to 130° C. Activation temperatures in this range are within or below the forming temperature according to the invention for a particular laminate. After a cooling below this activation temperature at least a sufficient initial glue strength between the layer material and the 3D carrier element is obtained so that the contact pressure can be removed pretty quickly and the product can be retrieved from the forming tool. The hot laminate is pressed against the carrier element and formed by a fluid pressure medium, in particular compressed air under a pressure medium pressure of 20 BAR to 300 BAR for a sufficient time period e.g. 20-30 seconds. When the liquid pressure medium is removed from the pressure bell quickly then the associated lowering of the temperature of the forming tool and of the coated carrier element facilitates a quick cooling of the glue layer below its activation temperature.

Further detail regarding the thermally activate able glue compounds can be derived from the document DE 10 2006 042 816 A1. The described thermally activate able glue compounds are advantageously used according to the instant invention. Thus thermally activate able glue compounds, melt glues and hot melt glues are advantageously heat able within seconds to their activation temperature and develop and provide a sufficient glue strength to the contact side of the laminate and to the 3D carrier element surface within seconds of cooling. Heat activate able glue compounds or hot melt glues sold by Covastro Deutschland AG, 41538, Dormagen, Germany under the tradename DESMOMELT (DESMOMELT®) are well suitable. This is a mix made from crystalline polyester polyols and crystalline di isocyanates which form poly urethanes with end hydroxol groups after heat activation. Good adhesions at different materials like for example leather, textiles, wood fiber materials and numerous plastic materials including PUR elastomeric materials and soft PVC is achieved. Various desmomelt types can be processed for example as a solution in selected solvents (e.g. Butanon-@, acetone or methyl ethyl ketone can be processed as melt glue foils or directly as a powder by direct coating. The minimum activation temperature is 60° C. When loaded with high pressure fluid a sufficient initial glue strength is already obtained within seconds wherein the glue strength increases further after a retrieval of the coated product from the forming tool during the next hours.

The laminate that is provided with a partial or entire dry layer made from thermally activate able glue compound or melt glue has to be heated enough before forming so that the glue compound or the melt glue is activated. This is performed according to the invention together with heating the laminate to its forming temperature.

The laminate element that typically has ambient temperature is heated before the 2 stage forming according to the invention to a forming temperature that is specific to the respective synthetic material. The forming temperature according to the invention is a function of the VICAT-softening temperature B50 or of the VST (Vicat softening temperature) B50 respectively according to DIN EN ISO 306 of the respective synthetic material. In order to determine the VST, a needle with a circular frontal surface of one $mm^2$. Under a predetermined force on a probe and a temperature is determined at which the needle one penetrated 1 mm deep into the probe. In the variant B50 a force of 50 n is used and a heating rate of 50° C. per hour. For various synthetic materials a Vicat softening temperature B50 or VST B 50 is described in the internet location http://wiki.polymerservice-merseburg.de "Vicat softening temperature-Encyclopedia of synthetic material testing. The subsequent table shows the VST B50 in ° C. for some synthetic materials and recommended forming temperature for compressed air forming during thermal forming (c.f. textbook "Thermoformen in der Praxis", von Peter Schwarzmann, Publisher ILLIG, second edition, Carl Hanser Verlag, Munich, 2008, therein page 40).

| Synthetic material | VST V 50 (° C.) | Recommended forming temperature ° C. according to ILLIG |
| --- | --- | --- |
| PC | 145 | 150-180* |
| PMMA | 103 | 140-170 |
| ABS | 87 | 130-160 |
| SAN | 106 | 135-170 |
| PA 6 | 200 | 230-240 |
| PS | 84 | 120-150 |
| PP | 90 | 150-160 |
| PVC-U | 77 | 120-140 |

*According to the invention thermoforming of PC semi-finished products is performed at or mostly at forming temperatures of 180° C. to 220° C.

According to the invention a heating to a forming temperature in a temperature range of [VST 50B (° C.) minus 20° C.) to (VST 50B (° C.) plus 23° C.)] is provided for the respective synthetic material. Further advantageously a heating to a forming temperature in a temperature range of (−10-+15° C.) is provided about the respective VST 50B. Foils and plates made from polycarbonate (PC) are advantageously heated to a forming temperature in a temperature range of 130° C.-158° C. The forming temperature that is provided according to the invention is thus significantly below the forming temperatures that are provided and used for the thermo forming.

In order to perform the heating advantageously a touch free heating is performed by radiation heaters under conditions where at least one side of the entire mold surface or of the major portion of the mold surface of the laminate layer assumes a surface temperature in a temperature range recited supra. The preceding forming temperatures are surface temperatures that are measurable by a heat image camera.

In order to perform the processing according to the invention the flat laminate element is applied to a frame carrier or a frame pallet or similar in a predetermined orientation. A frame pallet with a bar width of 30 mm to 60 mm is particularly suitable. The edge sections of the foil, the plate or the multilayer arrangement typically rests with a width of 20 mm to 30 mm on the bars forming the frame shaped pallet. Circular positioning pins that protrude from the bars and engage slotted holes that are recessed in the laminate element edge sections provide a defined arrangement.

The pallet that is supported on a frame of this type is moved into a heating zone and is heated to forming temperature by radiation heating, touch free, e.g. using infrared radiators or quartz radiators. Advantageously a heating zone is provided which includes 2 heating fields that have identical surface areas that are horizontally oriented and arranged in alignment with each other. The laminate element that is supported on the frame shaped pallet is centrally held for a certain time period between and at an equal distance from both heating fields. Typically each heating field has a larger surface than the aligned arrangement of pallet and laminate element. Additionally each heating field can be enveloped by a circumferential skirt which is oriented towards the laminate element that is to be formed and which reflects and focuses the radiation of the edge heat radiator onto the laminate element.

Each heating field includes a plurality of adjacent individually controllable flat radiators or quartz radiators which form a heat shield in combination. Advantageously rather small format infrared radiators or quartz radiators are being used. Full ceramic radiators with dimensions of 60 mm×60 mm are quite well suitable which assume a surface temperature of approximately 300° C. with a power consumption 125 Watt. Infrared flat radiators of this type are available from FRIEDRICH FREK GmbH, 58708 Menden, Germany.

Typically a distance between the surface of the laminate element to be formed and a surface of the upper heat shield and on the other hand side of the surface of the lower heat shield in a range of approximately 100 mm to 130 mm is provided. This achieves an overlap of the respective adjacent edge portions of adjacent infrared flat radiators or quartz radiators with respect to the heat radiation. The impacts of the flat radiator boundaries are minimized, and an even temperature distribution is achieved at the forming surface of the laminate piece to be formed.

The amount of heat that is transferrable by the heat shield into the laminate element is proportional to the fourth power of the heat shield temperature in ° K. The higher the heat shield temperature the shorter the heating time, this means the required dwelling time of the laminate element in the heating zone to achieve its heating to the forming temperature. A rather low heat shield temperature provides more flexibility for selecting the dwelling time which is important in particular for heating plates in order achieve a sufficient heating of the plate core zone and facilitates a reaction to particularities of the laminate surface caused e.g. a partial lettering, imprint, metallization and/or other coating. According to the invention advantageously a heat shield temperature in a range of 120° C. to 180° C. above VST 50B of the synthetic material to be formed is provided. This facilitates a sufficiently long dwelling time of the plate to be heated in the heating zone in order to sufficiently heat a plate core zone without damaging the plate surface.

With foils with layer thicknesses of 100 μm-500 μm typically a heating speed of 5° C.-10° C. per second is reached. The foil surface temperature corresponds approximately to a foil core temperature. A core zone of foil or plate is presumed at 40%-60% of layer thickness. For synthetic material plates, e.g with layer thickness of 3 mm to 10 mm a significantly lower heating velocity has to be presumed. Based on the boundary conditions recited supra good results were achieved when a plate that has ambient temperature is heated up to the forming temperature during a dwelling time in the heating zone which is advantageously:

for a plate with a plate thickness of 3 mm at least 70 seconds;

for a plate with a plate thickness of 6 mm at least 140 seconds; and for a plate with a plate thickness of 10 mm at least 230 seconds.

Further advantageously it is provided to keep the plate that is to be formed and that is introduced at ambient temperature into the heating zone in the heating zone for a dwelling time that is a function of the plate thickness [(plate thickness in mm)×23 seconds+c)]. In order to heat the plate to the forming temperature; c has a value of 3-70, further advantageously 5-50. In plates thus heated also the core zone has sufficient flexibility in order to be able to perform the mono directional forming into a mono directionally formed blank also at thicker plates. It is advantageous when each infrared flat radiator or quartz radiator is individually controllable at the heating screen recited supra. The controlling is performed by the electrical power consumption. A higher power consumption generates a higher surface temperature at a given infrared flat radiator or quartz radiator. Thus a fine control of the temperature distribution can be performed at the surface of individual portions of the form surface of a plate to be formed wherein the individual portions are associated with a particular infrared flat radiator or quartz radiator additionally through the control of power consumption of the individual infrared flat radiators. The effect of this fine control is the greater, the lower, the average surface temperature. Thus the heating of a plate to be formed is advantageously performed in a heating zone which is defined by 2 aligned heating fields which have an average heating screen surface temperature in a range of 120° C.-180° C. above VST B50 of the synthetic material to be formed from which the plate to be formed is made.

In order to achieve optimum results a rather precise control and measuring of the surface temperature is helpful at the section of a plate that is to be formed. In order to detect the surface temperature the plate that is heated in the heating zone can pass a temperature measuring station on a path from the heating zone to the forming zone, wherein a temperature distribution at a plate surface is scanned visualized or represented in another way by a heat imaging camera touch free.

This configuration of the method according to the invention achieves the subsequent advantages.

Ceramic infrared radiators of the type used herein emit their heat radiation in a wave length range of 2.5-10 μm. The heating of the plate is a function of absorption properties of the plate material and of reflection properties of the plate surface in this wave length range. A coating of the entire plate surface that is applied by co extrusion and/or the imprinting metalizing or other coating of a portion of the plate surface that follows a predetermined layout can significantly influence and change a plate surface temperature that is achieve able by a predetermined heat radiator surface temperature within a predetermined time span. A transparent plate material and/or a light colored coating sections reduce the heat absorption. In particular a metal coating thus made from AL, TI or CR can significantly reduce heat absorption. On the other hand side a dark to black coating section increases heat absorption. A plate surface temperature that is achievable in a predetermined arrangement with predetermined infrared flat radiators with in a predetermined time period is also a function of type and size of the imprint, metalizing and/or other coating of the plate section that is provided for the forming. Controlling individual infrared flat radiators can compensate these differences in order to achieve a uniform and even plate surface temperature. it can be furthermore desirable to make the plate material more flexible in individual plate sections where a particularly strong or particularly sharp edged forming is provided about a small curvature diameter which is achieved by a higher plate surface temperature in these locations. For this purpose in particular plate segments can be selected where a particularly strong mono directional forming of the originally flat plate shall be performed.

In view of the forming temperatures in a range of (−10° C. to +23° C.) about VST 50B of the respective thermoplastic synthetic material e.g. by about 130° C.-158° C. for 3D formed elements made from polycarbonate (PC) or about 90° C.-120° C. for 3D form elements made from poly (meth) acrylate (PMMA). Typically an infrared line camera is suitable as a thermal imaging camera which is configured for a temperature range of 0° C.-400° C. and which captures and processes temperature radiation in a wave length range of 8 μm-14 μm. Detecting the heat radiation is performed by a line sensor which can have e.g. 128 or 136 measuring elements. Infrared line cameras of this type with a corresponding processing circuit and processing software are commercially available. An infrared camera is proven particularly useful in the context of the instant invention which is sold by DIAS INFRARED GmbH, 01217, Dresden, Germany under the trade name INFRALINE®.

This infrared camera INFRALINE® is used for capturing temperature distributions touch free in a quantitative manner and substantially irrespective of distance at fixed objects and moving objects. The camera was developed for stationary applications in industrial environments and is useable for system solutions for automated process control and measuring data processing at machines and equipment. The camera is made from a camera head that includes modules that are required for operations. Due to the typically remote installation of the camera proximal to a process to be monitored or the objects to the monitored the camera does not have any operating elements. In order to provide control, monitoring and measuring value transmission a data interface is integrated into the camera. The programming and measuring value capture can be performed in a conjunction with a PC. In order to illustrate and process measuring data the visualization software PYROSOFT® that is provided by MICROSOFT INC., can be advantageously used which is capable to run PCs with the MS-window operating system. Based on color coding and numbers the measured temperature can be displayed with a precision of ¹/₁₀° K.

Based on the knowledge regarding the "actual" temperature distribution at a heated surface of a plate to be formed. Infrared flat radiators with a higher electrical power can be controlled to heat plate segments which have not reached the predetermined plate surface temperature so far e.g. due to particularities of the imprint, metallization, and/or other coating.

It is not necessary that the method step "measuring a processing the temperature distribution at the plate surface" is performed during the entire production process for producing all 3 D form elements of a particular type. Quite frequently it is sufficient when this method step is performed when setting up a production line and repeated subsequently after generating a predetermined number of 3D form elements in order to assure even uniform quality of the 3D form elements. Typically it is sufficient when this method step is only performed when producing at least 20% of all 3D form elements of one type that are to be produced. After the laminate element to be formed has been heated within the heat station to the desired surface temperature the hot laminate element is quickly transferred from the heating station into the forming station without a significant cooling. Even when the laminate element passes the temperature measuring station on a path from the heating station to the forming station and the temperature distribution at a bottom side is scanned, visualized or otherwise displayed by a thermal imaging camera the laminate element is transferred into the forming station immediately after completing is dwelling time advantageously within a time period of less than 5 seconds, particularly advantageously within a time period of less than 2 seconds and particularly advantageously within a time period of 1 second wherein mono directional forming of the hot flat laminate element is initially performed in the forming station.

In the forming station the two stage forming of the hot flat laminate element is performed according to the invention into the 3D form element or its coating onto the 3D carrier element. For this purpose a press with a forming tool can be advantageously used as described in the documents DE 10 2010 021 892 B4, DE 10 2008 050 564 B4 and DE 41 13 568 C1. These documents are incorporated in the instant application by this reference in as far as they are helpful to understand and configure the forming tool according to the invention.

BRIEF DESCRIPTION OF THE DRAWINGS

The invention is subsequently described in more detail with reference to advantageous embodiments. Based on advantageous embodiments with reference to drawing figures, wherein:

FIG. 3 illustrates a slanted view of a frame shaped pallet;

FIG. 4 illustrates a slanted view of a transport frame;

FIG. 5 illustrates a perspective view of a laminate element according to FIG. 2A on a frame shaped pallet according to FIG. 3;

FIG. 6 illustrates perspective view of a laminate element and a pallet according to FIG. 5 on a transport frame according to FIG. 4;

FIG. 8 illustrates a schematic side view of a forming tool according to the invention;

FIGS. 8A and 8B illustrates details of FIG. 8 illustrating a selected sealing device;

DETAILED DESCRIPTION OF THE INVENTION

In a cartesian coordinate system with three directions in space (X), (Y) and (Z) a rectangular flat laminate element E is provided in the X, Y-plane, which has longer sides (F) parallel to the X axis and shorter sides (G) parallel to the Y axis. This flat laminate element E is provided with a grid with parallel straight lines (F1-Fn) which have uniform distances from each other and which are oriented parallel to the sides F and with straight lines (G1-Gn) that have uniform distances from each other and which are oriented parallel to the sides G. an impact of 2 offset fixed, identical non-flat contours, thus e.g. a partially circular contour at a circle with a radius r=30 mm on two opposite edge sections that are oriented parallel to the X axis and offset from each other of the flat laminate element E on one axis to the X, Y plane, thus in the Z direction and only in the Z direction, thus mono directionally causes a mono directional forming of the flat laminate element E into a mono directionally formed blank (V) which additionally has an extension in the Z-direction. According to the auxiliary drawings the cord S has a length of 50 mm for a central angle of 120° and the circular arc (b) has a length of 63 mm according to the known formula b=(α πr)/180 c.f. KLEINE ENZYKLOPAEDIE—Mathematik VEB BIBLIOGRAPHISCHES Institut 50 mm and (b) INSTITUT LEIPZIG, 1967, page 203). And therefore the mono directionally formed blank (V) has a length in the X-direction that is 13 mm less than the originally used flat laminate blank E. Consequently the portions of the original flat laminate element E that have more or less distance from the apex point S have to move in X direction more or less towards this apex point S with a corresponding displacement of the laminate elements and therefore the displaced laminate elements have to be able to slide on a base that includes the original flat element E. A "mono directional forming" is characterized in that the original straight lines (F2-Fn) at the mono directionally formed blank (V) now have become cambered lines H2-Hn, whereas the original straight lines G1-Gn have been kept as straight lines G1-Gn with the original length. Consequently the mono directional forming of the flat laminate element E in X direction has not caused any forming of the flat laminate element E and displacement of the laminate particles in the orthogonal Y-direction.

Ideally this mono directional forming does not cause any increase of the surface the original flat laminate element E, thus it is performed without stretching. As long as the mono directional forming according to the instant invention is performed by 2 fixed substantially identical contours a no stretch or low stretch mono directional forming can be obtained at which a surface area increase at the original flat laminate element of up to 4%, advantageously up to 2% and particularly advantageously up to 1% of the original surface area can occur.

Figure 1:
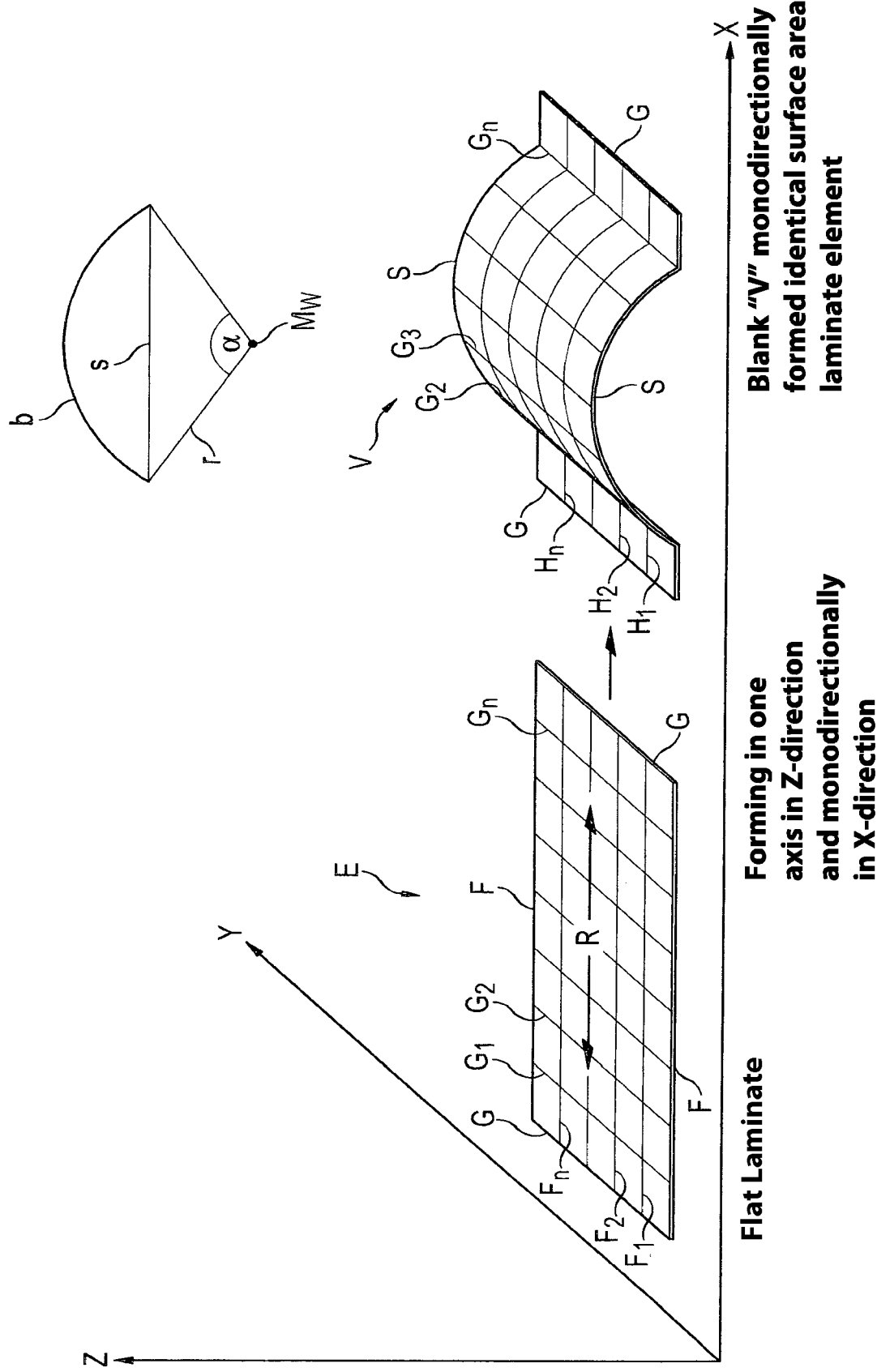
FIG. 1 illustrates a flat base material and a mono directionally formed blank obtained after mono directional forming with predetermined dimensions in order to illustrate the term "mono directional forming" in a cartesian coordinate system.
Figure 2A:
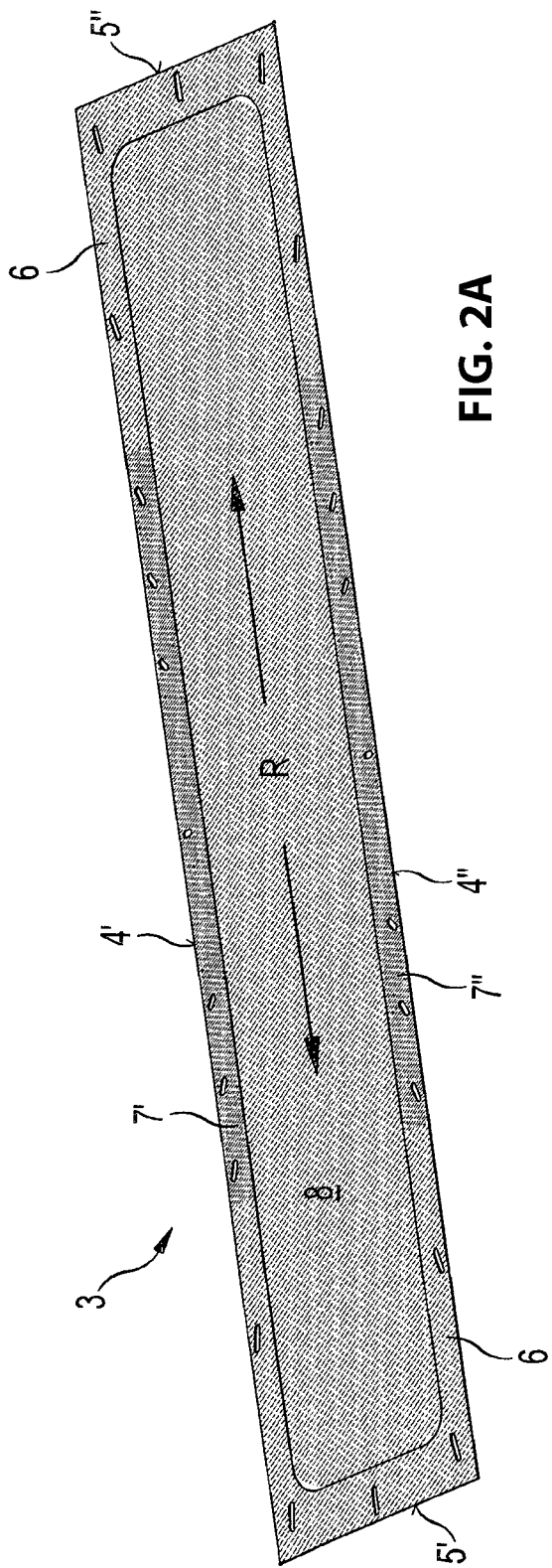
FIG. 2A illustrates perspective view of a flat laminate element to be formed.

A flat laminate element shall be hot formed. Advantageously a rectangular laminate element 3 is provided that is illustrated in FIG. 2A and which includes parallel offset longitudinal sides 4' and 4" and transversal sides 5' and 5". A first laminate direction R in which the laminate element 3 is not clamped on its bottom side but can slide is typically oriented parallel to the longitudinal sides 4', 4". The laminate element 3 has a circumferential edge zone 6 which includes parallel offset opposite edge sections 7', 7" at the longitudinal sides 4', 4". The edge zone 6 envelopes a formed surface at which the forming is performed. According to the subsequent embodiment 1 a flat rectangular laminate element 3 made from polycarbonate is formed which has a length of 1200 mm and a width of 200 mm.

Figure 2B:
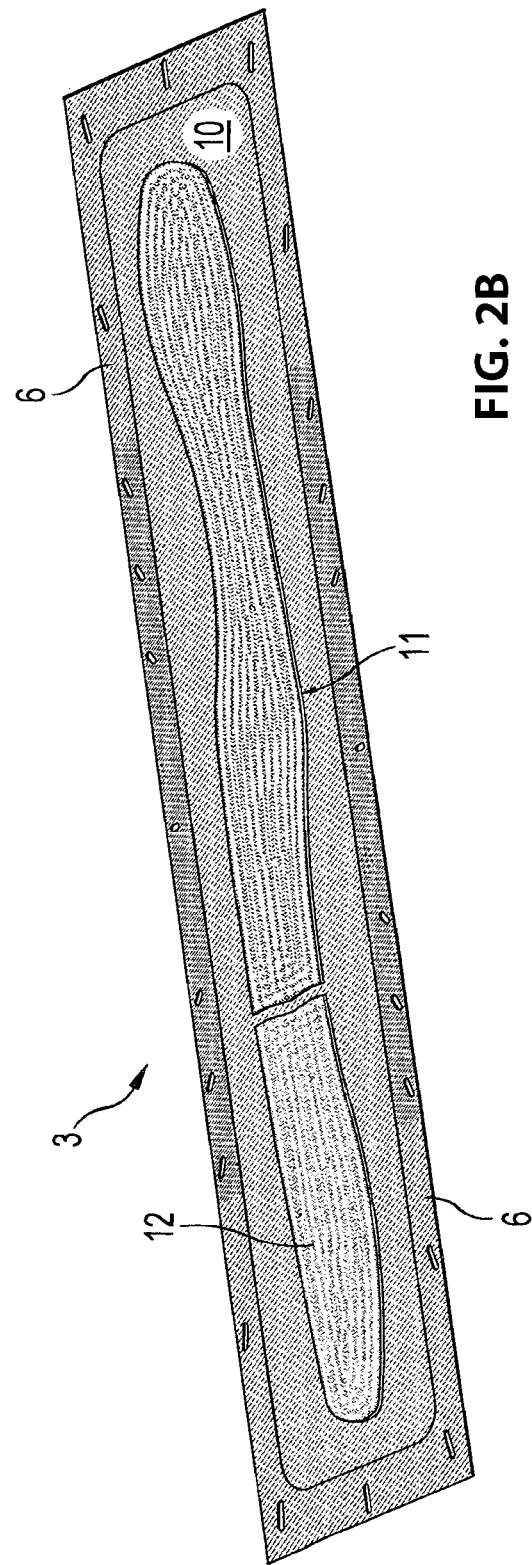
FIG. 2B illustrates a perspective view of a flat arrangement of a piece of transfer foil at which a laminate blank adheres that is provided with a glue layer.

When coating a 3D carrier element an alternative base material that is illustrated in FIG. 2B can be provided which includes a carrier or transfer foil 10 that is provided with an edge zone 6 at which a laminate blank 11 adheres that is adapted to the 3D carrier element wherein a surface of the laminate blank that is oriented away from the transfer foil 10 is covered with a layer 12 made from an activate able glue. In case of forming and coating a 3D carrier element the alternative base material assumes an arrangement in the forming tool in which the glue layer 12 is oriented downward towards the 3D carrier element to be coated. In this case when coating a 3D carrier element the statement "flat laminate element" shall also include a flat arrangement made from a transfer foil 10 at which a laminate blank 11 adheres that is covered with a layer 12 made from activatable glue.

Figure 7:
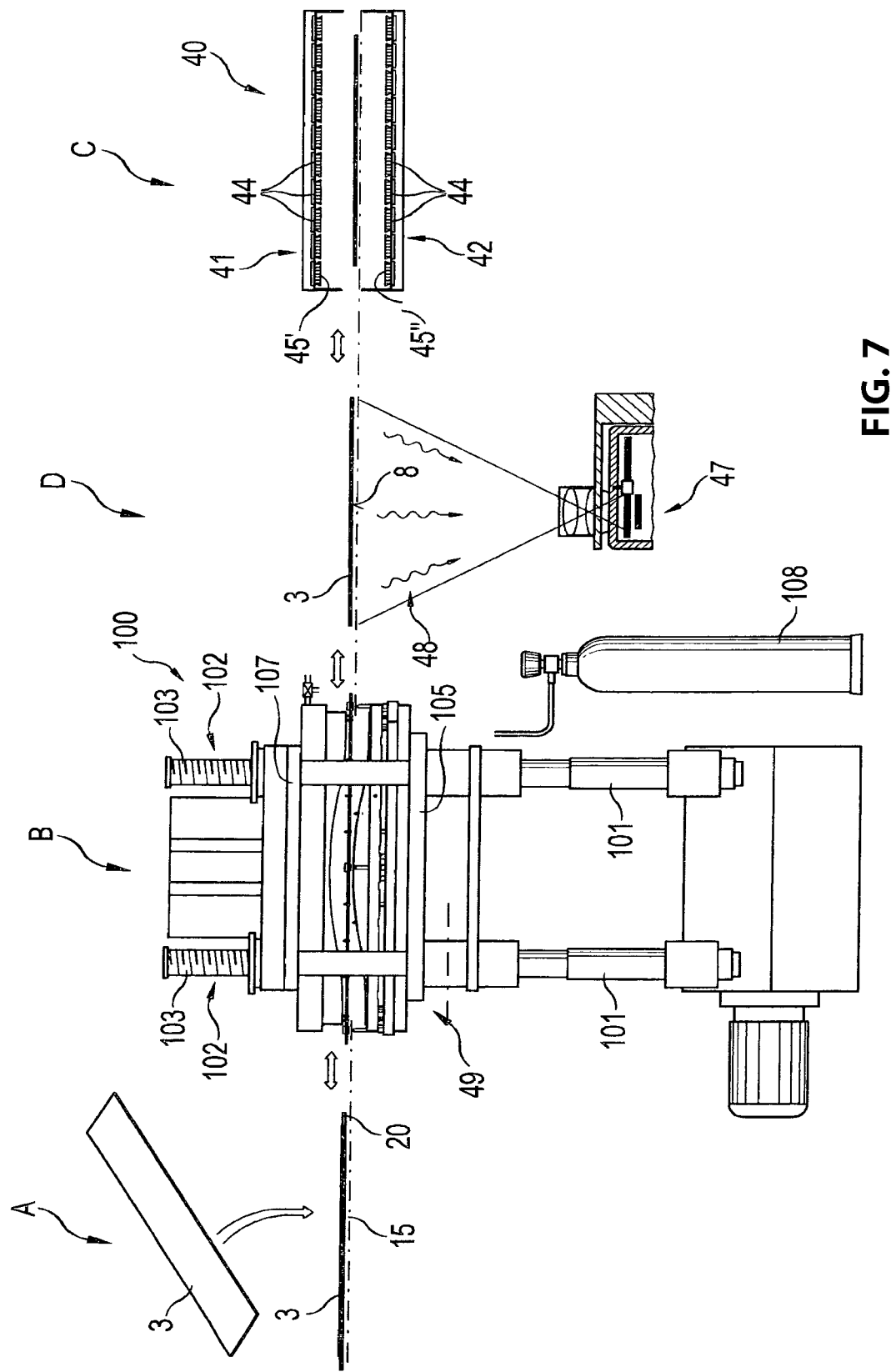
FIG. 7 illustrates a schematic view of essential components of an arrangement for performing the method according to the invention including a loading station and an unloading station, a forming station, a heating station and optionally a temperature measuring station.

The hot forming of the laminate element 3 is performed in an arrangement that is illustrated in FIG. 7 and includes a known loading and unloading station A, a forming station B, a heating station C and optionally a temperature measuring station D. A straight rail pair 15 runs through the entire arrangement. A transport frame 20 illustrated in FIG. 4 runs on this rail pair 15 wherein the transport frame has a closed, wide flat planar frame 21 that envelops a recess 22. The frame 21 is formed in steps so that a circumferential support 23 is provided that is directed inward towards the recess 22. Two "endless" timing belts 24' and 24" are attached at a front end 25 and at a rear end 26 of the frame 21. These timing belts 24' and 24" mesh with non-illustrated cogs which are driven by step up motors that are configured for a high acceleration and feed velocity in order to run the transport frame 20 along the rails 16 through the arrangement. For example the transport frame 20 can be adjusted with a velocity up to 1,400 mm per second along the rails 15.

The laminate element 3 to be formed is placed in the loading station and unloading station A on a frame shaped pallet 30 that is illustrated in FIG. 3 which in turn can be placed on the contact surface 23 at the transport frame 20. The frame shaped pallet 30 has a closed flat planar frame 31 which envelopes a recess 35. A number of protrusions 33 that protrude inward in a direction towards the recess 35 are integrally formed at an inner circumference 32 of the frame 31 in uniform distances. The circumferential edge zone of the laminate element 3 or of the transfer foil 10 is placed on these protrusions 33. This placement is performed in the loading station and unloading station A and can be performed manually or by an automated device. A respective vertically protruding mandrel 34 can be provided at selected protrusions 33 wherein the mandrel engages bore holes or slotted holes in the edge zone 6 in order to assure a defined arrangement of a laminate element 3 at the frame shaped pallet 30. The length of the slotted holes extends in the first laminate direction R in order not be impede a sliding of the edge zone 6 on this frame 31 when the laminate element 3 partially lifts off from the frame 31. Guide rings 37 can be arranged at the frame 31, wherein mandrels 53', 53", 53''' enter into the bore holes wherein the mandrels protrude vertically from a lower forming tool half 50 in order to assure a precisely fitted arrangement of the frame shaped pallet 30 with the laminate element 3 to be molded thereon with respect to a mold 55 or a 3D carrier element which is fixated at the lower forming tool half 50.

The frame shaped pallet 30 (e.g. FIG. 5) that is provided with the flat laminate element 3 is placed on the circumferential support 23 at the transport frame 20 c.f. FIG. 6 and the transport frame is moved along the rails 15 from the loading and unloading station A—the forming station B into the heating station C. In the heating station C there is a heating arrangement 40 in which the flat laminate element 3 that is made from the thermo plastic synthetic material and which has ambient temperature is heated to a predetermined forming temperature that is adapted to the respective synthetic material. Typically an infrared radiation heater is used and the heater arrangement 40 has an upper heating field 41 and an offset lower heating field 42 between which the transport frame 30 with the laminate element 3 to be heated is inserted. Both heating fields 41 and 42 are configured with identical surfaces and arranged in alignment with each other at a distance of approximately 250 mm. As indicated in FIG. 7 each heating field surface can be greater than the frame surface of the transport frame 20. Each heating field 41 and 42 can be made from a number of infrared flat radiators 44 which respectively have dimensions of 60×60 mm and which are individually controllable. An opposite infra-red flat radiator 45" at the lower heating field 42 can be associated with an infrared flat radiator 45' at the upper heating field 41.

After the laminate element 3 has reached the predetermined forming temperature or has exceeded it slightly the transport frame 20 is moved quickly from the heating station C back into the forming station B. This way an optional temperature measuring station D can be passed in which a thermal imaging camera 47 is arranged which captures and processes a temperature radiation 48 that is emitted by a bottom side of the forming surface 8 of the laminate element 3. The temperature distribution thus captured can be displayed on a non-illustrated screen wherein a respective image on the screen can be associated with each aligned infrared flat radiator 45', 45". The actual temperature that is provided at a surface of the laminate element bottom side can be represented by a color encoding and/or by numbers.

In the forming station B there is a press 100 with a forming tool 49 to which a compressed air container 100 is connected from which compressed air is provided. The press 10 and the forming tool 49 can be essentially of a type that is also described in the documents DE 10 2008 050 564 B4 and DE 41 13 568 C1.

FIGS. 8 (side view) 9 (perspective view) and 10 (reduced perspective view) show a forming tool 49 that is suitable for performing the 2 stage forming according to the invention of the hot flat laminate element 3 in its release position. As evident in detail from FIGS. 8 and 9 the forming tool 49 is essentially made from an upper forming tool half 80 and a lower forming tool half 50 which is arranged below the upper forming tool half 80 and which is supported on a lower forming table 105 of a press 100 and which is supported at the vertically oriented columns 101 of this press 100. This lower forming tool half 50 is associated with a carrier plate 51 and a base plate 52 on which a base 54 is supported at which the actual mold 55 is attached whose mold contours 56', 56" and 56"' perform the high pressure forming of the mono directionally formed blank. Alternatively the 3D carrier element can be attached at this substructure 54 wherein the hot mono directionally formed blank shall be coated onto 3D carrier element contours of the 3D carrier element. The base plate 52 can be advantageously provided with a heating arrangement which in turn includes a circulation system for a heating liquid or heating wires and a control arrangement for keeping the temperature constant. Furthermore a non-illustrated layer made from a thermally insulating material can be arranged between the carrier plate 51 and the base plate 52. Thus the temperature of the lower forming tool half 50 can be adapted to the forming temperature of the hot laminate element 3 to be formed.

A substructure 54 of this type has to be configured massive and attached in a stable manner in order to sustain the substantial mechanical pressure loading. In case of coating a 3D carrier element a new 3D carrier element has to be attached at this substructure 54 and disengaged again after coating.

For this purpose a fold able substructure 54 can be provided which includes at least one non-illustrated slide which is configured extend able and retract able, arranged and actuate able. Extending the move able slide can be performed e. g. hydraulically or pneumatically against a spring force which is configured to retract the slide. The extended slide reaches behind a retention bar or an undercut at the applied 3D carrier element and assures its support at the sub structure 54. This achieves on the one hand side a secure and stable attachment and on the other hand side easy disengagement of the 3D carrier element at the from the substructure 54. After performed the coating and achieving sufficient glue strength an extended slide is run back or pulled in and the coated 3D carrier element can be removed from the sub structure 54 easily. Inserted the 3D carrier element and removing the coated 3D carrier element can be performed by hand or by an automated machine.

Figure 9:
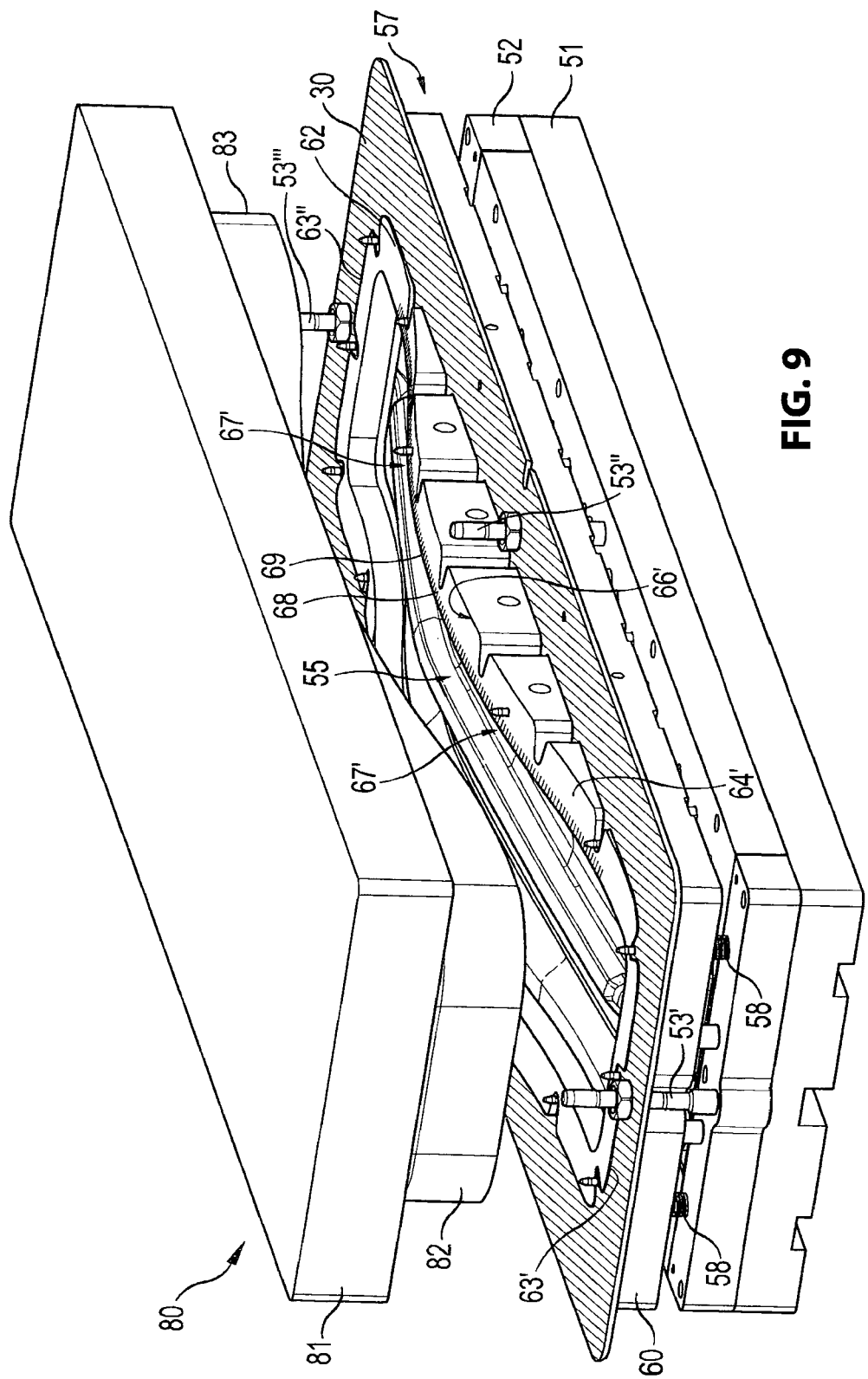
FIG. 9 illustrates a perspective view of the forming tool according to FIG. 8.

The substructure 54 with the mold 55 or with the 3D carrier element is enveloped by a closed clamping frame which is supported on the base plate 52. A clamping frame 52 can be used that is supported on the base plate 52. Alternatively a clamping frame with sprig suspension this means a so called spring frame 57 can be used which is supported at the base plate 52 by compression springs 58. A spring frame 57 of this type is illustrated in FIGS. 8 and 9. The subsequent statements regarding the spring frame 57 however relate equally to a clamping frame that is supported at the base plate 52.

At a spring frame 57 (or clamping frame) the two non-flat contours are arranged which contact the 2 parallel offset opposite edge sections 7', 7" of the hot flat laminate element 3 that rests on the frame shaped pallet 30 in order to form the flat laminate element 3 into a mono directionally formed blank W.

In an advantageously embodiment that is illustrated in FIGS. 8 and 9 the spring frame 57 or the clamping frame has a massive closed flat frame whose outer dimensions are identical or slightly less than the outer dimensions of the frame shaped pallet 30 so that the frame 60 can reach under the frame shaped pallet 30 and lift it within the transport frame 20 that is held in place. This frame 30 has a circumferential edge zone. The frame 60 is replace ably arranged at the lower forming tool half 60. A height of the frame 60 corresponds to a height of the substructure 54 plus the mold 55 or the height of the sub structure 54 plus the 3D carrier element, so that the frame 60 is adaptable in so far to the employed mold 55 or the 3D carrier element to be coated. When this frame 60 has reached its upper dead center then the bottom side of the frame shaped pallet 30 contacts its edge zone 61 wherein the frame 60 has lifted the pallet with respect to the locally fixated transport frame by a small amount. When the clamping frame is supported directly at the base plate 52 then the upper most point of the mold contours 56', 56" or 56"' or of the 3D carrier element contours contacts a bottom side of the mono directionally formed blank or is slightly below in this arrangement. When using the spring frame 57 the press 100 can lift the base plate 52 with respect to the fixed frame 60 by a small distance, wherein the compression springs 58 are compressed and the base plate 52 with the substructure 54 moves even closer to the blank that is clamped in place so that the form contours 56', 56" or 56"' or the 3D carrier element contours penetrate through the bottom side of the blank at least partially and provide at least a certain orienting "mechanical" positive forming to the clamped blank like a plunger wherein the positive forming is subsequently supplemented and completed by the high pressure forming.

The two non-flat contours that cause the mono directional forming are arranged at this frame 60 and can be configured e.g. integrally in one piece further advantageously a replace able frame superstructure 62 that is adapted to the respective product to be produced wherein the super structure includes 2 flat end sections 63' and 63" with 2 parallel and offset side walls 64' and 64" which are oriented orthogonal to the end sections 63' and 63" and which include a flat bottom side which can be applied to the frame 60 and attached thereon. This frame superstructure 62 has a circumferential upward oriented face which is used as a contact surface 65 for the edge zone 6 of the laminate piece 3 that is to be hot formed.

Each side wall 64' and 64" has a face section which is respectively used as a contact surface section 66' and 66" for a respective edge section 7' and 7" of the laminate element 3 to be formed. Each contact surface section 66' and 66" is configured as an identical or substantially identical contour 67' and 67", e.g. starting with a flat end section 63' then rising gently to an apex point 69 and then descending again gently to another opposite flat end section 63". The two non-flat contours 67' and 67" form the non-flat contact surface contour 68 at the lower forming tool half 50, advantageously the two contact surface sections 66' and 66" are arranged at both longitudinal sides of the superstructure 64 or at the 2 longitudinal sides of the clamping frame or of the spring frame 57. In the instant case as illustrated in FIGS. 8 and 9 this non-flat contact surface contour 68 protrudes relative to the remaining flat contact surface sections 63' and 63" or is configured convex and has a centrally arranged apex point 69.

In this embodiment illustrated in FIGS. 8 and 9 this apex point 69 can have e.g. a height of approximately 80 mm to approximately 120 mm above the flat bottom side of the frame superstructure. The bottom side or base surface of the frame super structure 62 has exterior dimensions that fit into the recesses 35 at the frame shaped pallet 30. The outer circumference of the frame shaped super structure 62 is aligned with the outer circumference of a subsequently described circumferential cavity wall 83 of a pressure bell 82 at the upper forming tool half 80.

Furthermore the forming tool 49 has an upper forming tool half 80 which includes a cover plate 81 which is supported in a press 100 at an upper form table 107. A pressure bell 82 is configured at this cover plate 81 which forms a downward open cavity which has a circumferential cavity wall which is defined by a lower face which forms a circumferential sealing surface 85 of the upper forming tool half 80. In this seal surface 85 a circumferential groove 89 is recessed at a small distance from the cavity of the pressure bell 82 wherein a strand shaped sealing device is insert able into the circumferential groove wherein the strand shaped sealing device seals the cavity of the pressure bell 82 pressure tight relative to the blank when contacting the top side of the mono directionally formed blank.

When the form surface is smaller than 800 cm$^2$ at the hot formed laminate element 3 typically no larger curvature changes will occur at the arch of the pressure bell 82 when loaded with pressure from the high pressure fluid so that a typical O ring made from an elastic circular thread with a diameter of approximately 3 mm-6 mm will suffice as a sealing device. In order to implement a form surface of at least 800 cm$^2$ the press and the pressure bell have to be configured for a maximum pressure medium pressure of 300 bar for at least a mold closing force of 24 mega Newton. The press and the pressure bell move under these tremendous forces and a certain amount of bending and warping can occur which would drive a circular seal that is more than 100 cm long from its groove. In order to still provide a pressure tight sealing of the pressure bell a more effective sealing device has to be used under these severe operating conditions. For this purpose a strand shaped profile seal 90 is provided which includes a body 91 that is insertable into the groove 89 wherein at least a first integrally seal lip 92 protrudes from the body 91 and is defined by an outer seal lip flank 93 and by an inner seal lip flank 94. The inner seal lip flank 94 is arranged at a slant angle with respect to the seal surface plane so that fluid pressure mediums that flow in under a pressure of 20 bar to 300 bar and impact the inner seal lip flank 94 deform the seal lip 92 elastically and press it against the laminate 3. Using this particular type of strand shaped profile seal 90 also forming tools with a comparatively large forming surface of 2000 cm$^2$ and more e.g. with a forming surface of at least 3400 cm$^2$ or more can be safely sealed so that also rather large laminate elements can be formed in this forming tool and coated onto rather large 3D carrier elements which can e.g. have a length of 100 cm or more. Further details regarding a strand shaped profile seal of this type can be derived from the document DE 10 2008 050 564B4 which is incorporated in its entirety by this reference with a description of a strand shaped profile seal of this type.

A channel 96 leads into the cavity of the pressure bell 82 wherein a fluid pressure medium can be introduced into the cavity of the pressure bell 82 through branches 97 of the channel 96 and removed again therefrom. Merely schematically indicated control device 98 control the pressure medium supply and the subsequent ventilation. The fluid pressure medium that is supplied through the channel 96 can have an increased temperature in order to counter act a cooling of the hot laminate element 3.

Figure 10:
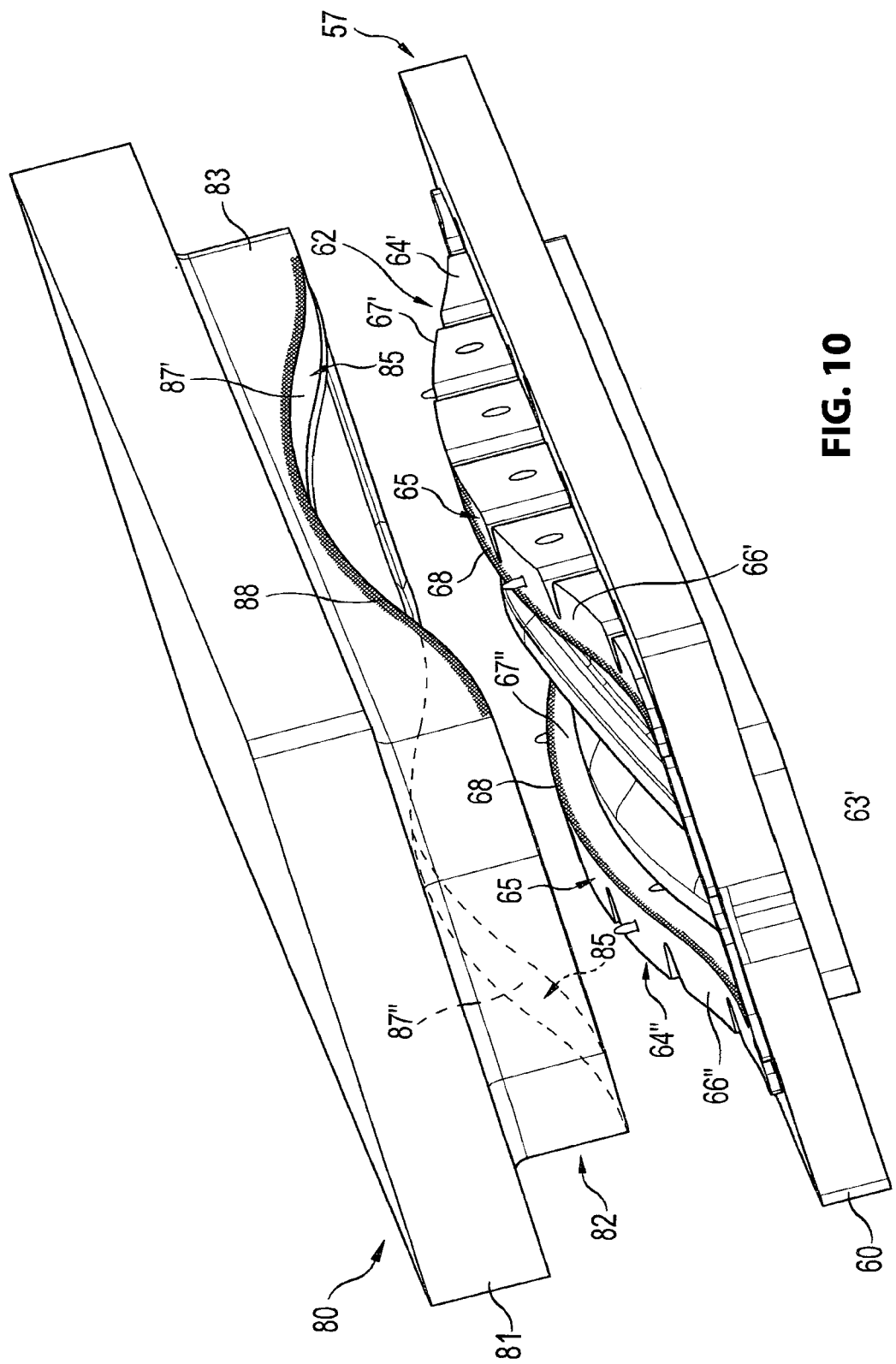
FIG. 10 illustrates a schematic perspective view of an interior of the forming tool, wherein in particular the non-flat sealing surface contour at the upper forming tool half and the congruent non-flat surface contour at the frame superstructure at the lower forming tool half is emphasized.

It is a particular feature of the invention that the pressure bell 82 has a respective sealing surface section that includes a non-flat contour in addition to the flat sealing surface sections at both end sections of the pressure bell 82 at the sealing surface 85 at 2 parallel offset opposite pressure bell sections 84' and 84" forming an identical or substantially identical non-flat contour 87' and 87" and both together form a non-flat sealing surface contour 88 at the upper forming tool half 80. Advantageously the 2 sealing surface sections are configured at both longitudinal sides of the pressure bell 82. In the illustrated case and as illustrated in FIGS. 8, 9 and 10 this sealing surface contour 88 is configured concave and has a centrally arranged valley. This non-flat sealing surface contour 88 at the upper forming tool half 80 is configured congruent to the non-flat contact surface contour 68 at the lower forming tool half 50 so that a narrow gap can be formed between the two contours 88 and 68.

When the lower forming tool half 50 is lifted relative to the upper forming tool half 80 by the press 100 the frame structure, the frame structure 62 at the clamping frame or spring frame 57 that is arranged within the recess 35 of the frame shaped pallet is lifted with respect to the frame shaped pallet 30 that rests fixed in place on the transport frame 20, wherein the super structure contact surface 65 including non-flat contact surface contours 67' and 67" reach under the parallel offset and opposite edge sections 7' and 7" of the laminate element 3 and move them along and eventually move them proximal to the congruent seal surface 85 including the non-flat contours 87' and 87" at the pressure bell 82, wherein the entire hot flat laminate element 3 is formed between the congruent non-flat contours 58 and 88 mono directionally into a mono directionally formed blank W.

Due to the lifting movement of the lower forming tool half 50 the formed blank in lifted until its edge zone 6 contacts the sealing device. The sealing device seals the laminate element 3 pressure tight relative to the pressure bell 82 so that high pressure fluid that flows into the cavity of the pressure bell 82 applies and presses the blank against the form contours 56', 56", 56''' of the form 55 or against the 3D carrier element contours.

In case the forming tool 49 shall be used to form a laminate element 3 with a form surface 8 that is significantly larger than 800 cm2, the lower forming tool half 50 is lifted until a narrow gap is formed in the closed position of the forming tool 49 between the sealing surface 85 including the non-flat sealing surface contour 88 at the upper forming tool half 80 and the contact surface 65 including the non-flat contact surface contour 68 at the lower forming tool half 50, wherein the gap can be bridged by the seal lip 92 at the strand shaped profile seal 90. Pressure fluid that flows into the pressure bell 82 distorts the elastic seal lip 92 at the strand shaped profile seal 90 that is inserted into the groove 89 and presses the seal lip 92 against the top side of the blank and thus seals the cavity of the pressure bell 82 pressure tight relative to the blank. The pressure fluid that flows into the pressure bell 82 thereafter presses the hot blank against the form contours 56', 56", 56''' of the form 55 or coats the blank onto the 3D carrier element contours. This gap typically has a width of [layer thickness of the laminate element 3 to be formed+(100 µm to 1200 µm)].

The forming tool 49 described supra is inserted into a press 100 which is described in more detail in the document DE 10 2008 050 564 B4 which is incorporated in its entirely by this reference. The press 100 has a so called 4 column frame with four vertical columns 101 arranged at corners of a square or rectangle, wherein the upper form tool half 80 and the lower form tool half 50 are move ably supported at the columns 101. The straight rails 15 that extends through the entire arrangement are run within the forming station B between a respective column pair made from 2 offset columns 101. The transport frame 20 with the hot flat laminate element 3 to be formed wherein the transport frame is supported within the forming station B at the rails 15 forms a fixed arrangement relative to which the components of the lower forming tool half 50 form relative movements during adjustment.

At the forming tool 49 according to the invention also the upper forming tool half 80 is liftable by a significant distance in order to be able to also retrieve 3D formed elements or coated 3D carrier elements with a very pronounced geometry from the intermediary space between the seal surface 85 at the raised upper forming tool half and the transport frame that is held in place after high pressure forming. This lifting travel can have e.g. a length of 100 mm and more. The length of the outer thread sections 103 at the upper sections 102 of the four columns 101 is adapted accordingly.

Figure 11:
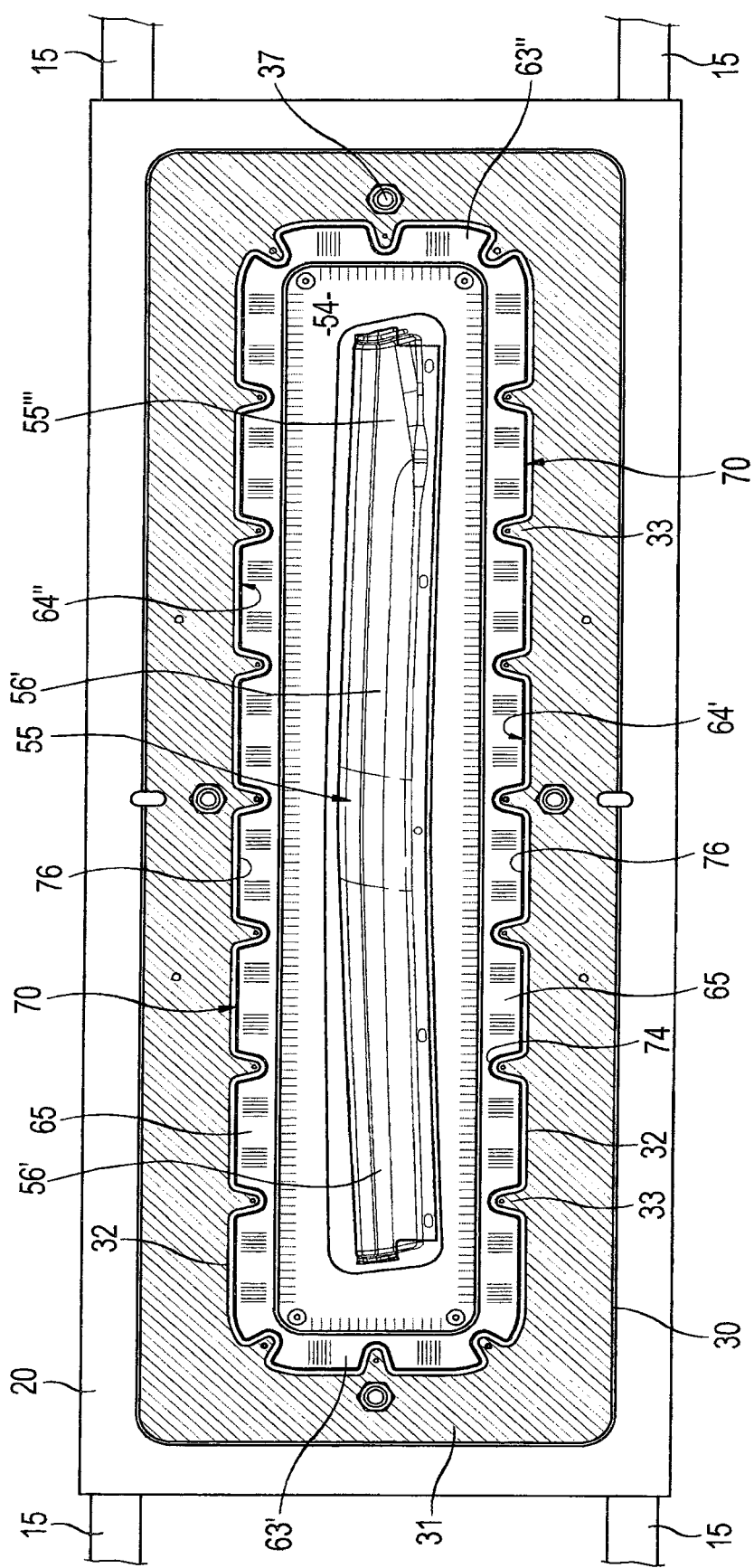
FIG. 11 illustrates a top view of the pallet frame and the transport frame and the contact surface of the frame shaped super structure in front of the mold carrying substructure at the lower forming tool half.

FIG. 11 schematically illustrates a view from above onto a transport frame 20 that is supported at the 2 rails 15 wherein a frame shaped pallet 30 without laminate element 3 is arranged on the transport frame wherein the transport frame and the pallet are both arranged in the forming station B above the forming tool half 50. It is evident that the flat frame shaped pallet 30 has a frame 31 which includes a plurality of offset inward oriented protrusions 33 at an inner circumference 32 of the frame 31. A flat laminate element 3 that is to be placed on a frame shaped pallet 30 is placed with its edge zone 6 only on the protrusions 33.

Within and below the recess 35 at the frame 31 of the pallet 30 the contact surface 65 of a frame super structure 62 is visible at the frame 60 of the spring frame 57. This super structure 62 has opposing side walls 64' and 64" respectively with a structured outer surface 70 and respectively with a face which forms a contact surface 65 where recesses 74 and outward protruding bars 76 are arranged at this structured outer surface. The resulting external circumference of the super structure is adapted to an inner circumference 32 at the frame 31 of the frame shaped pallet 30 so that this super structure 62 is moveable at a close distance from the inner circumference 32 of the pallet frame 31 with respect to the pallet 30 that is held in place, the protrusions 33 at the inner circumference 32 of the pallet frame 31 engage recesses 74 at the outer circumference 72 of the tension frame or of the spring frame 57 or of the frame assembly 62;

the protruding bars 76 at the outer circumference 72 at the tension frame or the spring frame 57 or the frame assembly 62 engage the intermediary spaces between two respective adjacent protrusions 33 at the pallet frame 3; and when lifting the tension frame or the spring frame 57 or the frame assembly 62 relative to the pallet 30 that is fixed in place the protruding bars 76 at the outer circumference 72 of the tension frame or the spring frame 57 or the frame assembly 62 reach below the rim sections 7' and 7" of the flat laminate element 3 and move them along so that they deposit the laminate element 3 on the contact surface 65 at the tension frame or at the spring frame 57 or at the frame assembly 62, so that during an additional lifting of the tension frame or of the spring frame 57 or of the frame shaped super structure 62 with respect to the fixated upper forming tool half 80 the laminate element 3 is formed monodirectionally into a mono directionally formed blank W between the non-flat contact surface contour 68 and the congruent non-flat sealing surface contour 88.

Figure 12A:
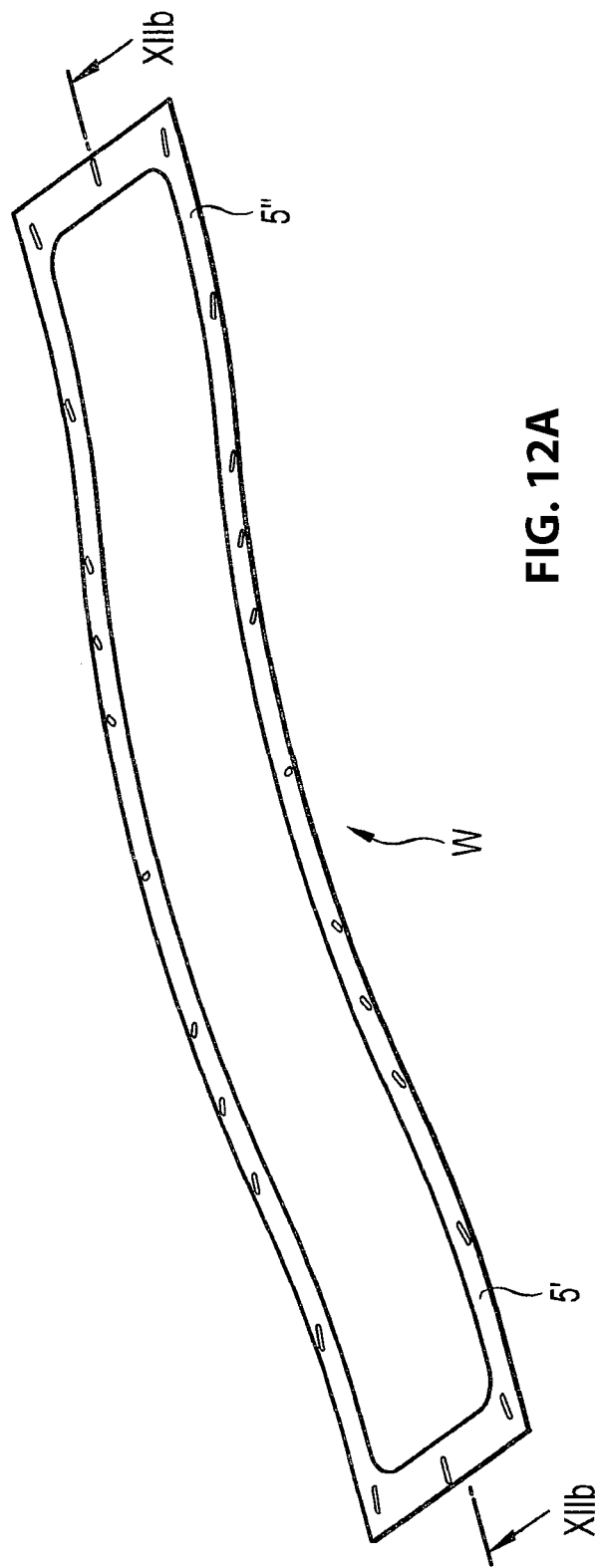
FIG. 12A illustrates an isolated mono directionally formed blank that is removed from the forming tool and merely represents an intermediary product.
Figure 12B:
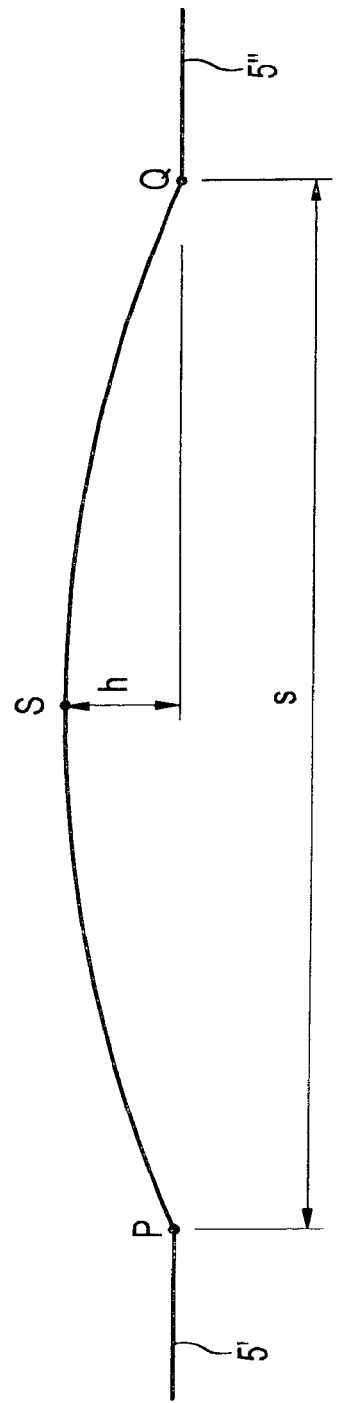
FIG. 12B illustrates a schematic representation of a cut along the sectional line XIIb-XIIb of FIG. 12A.

Performing the method according to the invention according to the embodiment 1 with a blank W illustrated as a non-insolated intermediary product is illustrated in FIG. 12A because this type of blank cannot be illustrated easily within the machine drawing. This blank W has a slightly cambered section adjacent to two flat end sections 5' and 5" wherein the slightly cambered section starts at point P and terminates at point Q and has a central apex point which reaches an apex height "h" over a cord "s" that connects the two points P and Q with each other. At the blank W an apex height "h" of 73.5 mm is obtained for a length of the cord "s" of approximately 700 mm. This yields a camber ration= (h×100%)/s of 10.5%. This is a remarkable result for a foil element made from thermoplastic synthetic material that is formed without stretching. It is evident that cambered foil elements that are formed without stretching can be obtained according to the invention with an even larger camber ration.

Embodiment 1

Figure 13A:
FIG. 13A illustrates a schematic side view of a finished product according to embodiment 1.
Figure 13B:
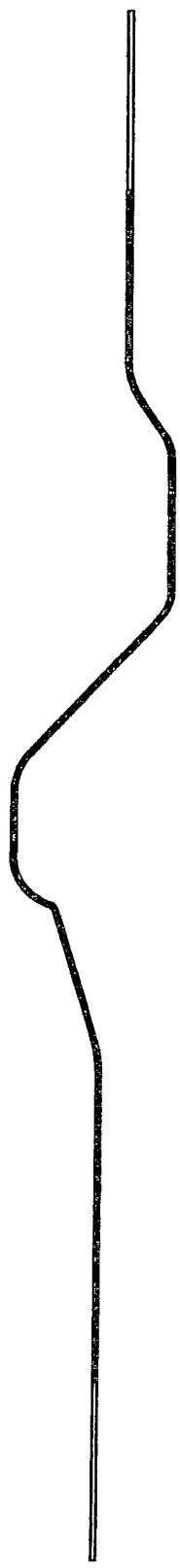
FIG. 13B illustrates a cross section in width direction through the finished product according to FIG. 13A

As a final product a metal a trim strip with a metal shine shall be provided for the dashboard of an often SUV that is developed by a German premium manufacturer. This trim piece has dimension of 1030 mm×85 mm and has a three-dimensional shape or geometry in the longitudinal direction (longitudinal contour) and in the width direction (width contour). The long contour follows a slightly convex curvature with a central apex point which reaches a height of 73.5 mm above a plane of the two end sections. A side view of this longitudinal contour is illustrated in FIG. 13A. The width contour has several waves with a maximum distance of 22.9 mm between a wave valley and a wave ridge. This width contour is illustrated in FIG. 13B according to scale in a sectional view in width direction through a 3D-foil element that is produced according to the invention.

A PC foil that is coated with a black cover lacquer with a foil thickness of 550 µm is used as a base material for a test. As an alternative base material, a highly transparent OPTO 4D-foil made by Isosport Verbundteile GmbH, 7000 Eisenstadt, AT, has been used with good success.

From the PC foil a flat, rectangular foil element with a length of 1270 mm and a width of 260 m has been cut. This foil element has a form surface of 1200 mm×200 mm within its edge zone. The forming is performed in a machine that is developed and built by NIEBLEIN GMBO, 82377, Penzbert, Del., and which is configured and equipped as illustrated in FIG. 7. The forming tool is essentially configured according to FIGS. 8, 9, 10a and 10b for a form surface of 1200 mm×200 mm.

The heating station has two heat shields that have identical surface and that are equipped with infrared flat radiators which are arranged at a distance of 250 mm from each other. Each heat shield surface exceeds the foil element surface. Each heat screen surface both heat screens are kept at a temperature of 300° C. The foil element that has ambient temperature is arranged resting on the pallet frame and the pallet frame resting on the transport frame centrally between the two heat screens and heated within approximately 10 seconds to a surface temperature of 158° C. After reaching the forming temperature the hot foil element is moved back within two seconds into the forming station and arranged in the forming tool that is in its release position. The lower forming tool half is raised and reaches its closing position in approximately one second, wherein the lower form table raises the frame structure arranged thereon, wherein the two non-flat contact surface contours reach under to parallel offset opposite edge sections at the hot foil element at parallel offset and opposite side walls of the frame structure and lift the edge sections and move them proximal to two congruent seal surface structures at the pressure valve in the upper forming tool half, wherein the entire hot foil element is formed into the monodirectionally formed blank. The configuration of the blank is substantially similar to a longitudinal contour of the trim piece illustrated in FIG. 13A.

Compressed air that is heated to a temperature of approximately 90° C. to 100° C. is introduced into the pressure valve under a pressure of 90 bar. This air pressure is maintained for approximately 3 seconds. Subsequently ventilation is performed for approximately 4 to 8 seconds. Thereafter the upper forming tool half is lifted by approximately 80 mm in another time period of 15 to 20 seconds. Through a lowering of the lower forming tool half also the pallet frame with the 3D-formed element placed thereon is lowered to the transport frame that is held in place on the rails and the transport frame is moved into the loading and unloading station. There, the 3D-formed element is removed by hand and is ready for further processing.

During the further processing the 3D-form element produced according to the invention is inserted into an injecting mold and back injected with another synthetic material that melts into liquid form, thus advantageously with PC/ABS material.

Trying to form that same 3D-form element according to the conventional HPF method in one step from the flat laminate directly into the 3D-form element would require at least a rectangular, flat foil element with a length of 1500 mm and a width of 500 mm in order to provide pull surface that are required for expanding and stretching the foil material. The 3D-formed element would have a high level of internal tensions and layer thickness variations.

Embodiment 2

An essentially rectangular rear window for a medium-sized car shall be provided. A window length transversal to the vehicle driving direction is greater than a window width. The window width is defined by two straight slightly outward slanted width edges so that an upper window length (adjacent to the vehicle roof) is 1080 mm and a lower window length between the lower width edge ends is 1200 mm. The upper longitudinal side edge is slightly concave with respect to a cord that connects the two upper width side edges with one another at a distance from 40 mm at the central depression from the cord. The lower longitudinal side edge is highly convex and rounded with respect to a cord that connects the two lower width side edge ends with each other at a distance of 300 mm from the center apex to the cord. The window width between the center valley at the upper longitudinal side edge and the ape at the lower longitudinal side edge is 830 mm. The rear window has a camber wherein the longitudinal contour is configured more cambered than the width contour.

A rear window pane of this type is produced from a two-layer coextruded plate which is made from a 3 mm thick PC-layer and a 2 mm thick PMMA-layer. During production a PMMA-layer is extruded onto a hot, just extruded PC-layer and both layers are run through a calender roller gap. A flat plate with dimensions of 900 mm×1300 mm is cut from the cooled web. The PMMA-layer later forms the outer layer of the rear window pane at this plate. The PC-layer at the rear window pane is oriented towards an interior of the vehicle. At the flat plate a band made from black paint is printed onto the PC layer by silk screening wherein the band is adapted to a circumferential contour of the rear window pane. The band has a width of 100 mm adjacent to the upper longitudinal side edge. At the remaining edges a band width of 70 mm is provided. At an inner edge of the band a number and density of black dots applied by silk screening decreases in order to provide a sliding transition to an inner surface of the rear window pane that has no print. On this inner surface lines made from metal particle paste are printed which form conductive paths for heating wires. Subsequently a respectively UV-hardening hard coat layer is applied to the PC-layer and to the PMMA-layer. Thus a liquid product can be sprayed on which is sold by Nanogate Glazing Systems B.V., NL-5667 KZ Geldrup, The Netherlands, under the tradename SICRALAN® hardcoat coating (SICRALAN® is a registered trademark).

Upon the flat plate thus prepared the two stage forming according to the invention is performed. This plate has a form surface of 1250 mm×850 mm within its edge zone. The two-stage forming is performed in a machine developed and built by NIEBLING GMBH 82377 Penzberg, Germany, which is configured and equipped according to FIG. 7. The forming tool is configured essentially according to FIGS. 8 and 9 and configured for a form surface of 1250 mm×850 mm.

The heating station has two heat screens that have identical surface areas and that are equipped with infrared flat radiators and arranged at a distance of 250 mm from each other. Each heat screen surface is larger than the plate surface. Both heat screens are maintained at a temperature of 360 degrees C. The plate with ambient temperature is placed on the pallet frame which rests on the transport frame so that the plate is centrally arranged between both heating screens and heated within approximately 180 seconds to a surface temperature of 160 degrees C. After reaching the forming temperature the hot plate is run back into the forming station within 2 seconds and arranged there inside the forming tool that is in its release position. The lower forming tool half is raised and reaches its closing position in approximately 1 second, wherein the lower form table raises the spring frame and the frame super structure arranged thereon, wherein the two non-flat contact surface contours reach under two edge sections at the longitudinal sides of the hot plate that are parallel, offset and opposite to each other at parallel, offset and opposite side walls of the frame superstructure so that the hot plate is raised and moved proximal to two congruent ceiling surface contours at the pressure valve in the upper forming tool half, wherein the entire hot plate is formed I a time period of 2 to 3 seconds into the monodirectionally formed blank. This configuration of the blank is substantially adapted to the long contour of the rear window pane to be produced and has an apex height of approximately 120 mm at the convex apex relative to the offset flat plate sections.

Compressed air with a pressure of 90 bar that is heated to a temperature of approximately 90° C. to 100° C. is introduced in the pressure valve. This air press is maintained for approximately 5 seconds, thereafter a ventilation is performed within a time period of 4 to 8 seconds. Thereafter the upper forming tool half is raised by approximately 150 mm within an additional time period of 30 to 50 seconds. Lowering the lower forming tool half also lowers the pallet frame with the 3D-formed element resting thereon onto the transport frame that is held in place at the rails and the transport frame is run into the loading and unloading station. When moving out of the open forming tool the rear window pane blank has a temperature of approximately 60° C. In the loading and unloading station the rear window pane blank is removed by hand and processed further.

During further processing UV-hardening of the coating at the top side (rear window pane outside) is performed and a UV-hardening of the coating at the bottom side cooled rear window blank (rear window pane inside) is performed. After this UV-hardening the blank is cut to size by a 3D-milling machine to match the final dimensions and a circumferential contour of the rear window pane. The edges that are formed are deburred and finished. Furthermore, an electrical connection is applied to contact the heating wires.

What is claimed is:

1. A forming tool for high pressure forming a single layer or multi-layer laminate element, the forming tool comprising:
    an upper forming tool half which forms a pressure bell into which a fluid pressure medium, in particular compressed air is introducible at a fluid medium pressure of 20 bar to 300 bar, and
    which includes a circumferential sealing surface in which a circumferential groove is recessed into which a sealing device is inserted; and
    a lower forming tool half,
    which includes a base plate on which a substructure is supported at which a form with form contours or a carrier element that is to be laminated and which is provided with 3-D carrier element contours is attached, at which contours the laminate that is loaded with the fluid pressure medium is formed, and
    wherein the substructure is enveloped by a tension frame supported at the base plate or by a spring frame that is supported on compression springs (58) at the base plate wherein a hot laminate element to be formed is applicable to the tension frame or the spring frame; and
    wherein the lower forming tool half is able to assume a release position that is remote from the upper forming tool half and a closing position that is adjacent to the upper forming tool half,
    wherein in this release position a transport frame with a frame shaped pallet and the hot laminate element placed thereon is insertable between the two forming tool halves and assumes a position in which the tension frame or the spring frame assumes an arrangement within and below the recess at the frame shaped pallet,
    wherein in the closing position the hot laminate element maintains a small distance from the sealing surface at the pressure bell and is applicable at this location to the sealing device so that the pressure bell is sealed pressure tight relative to the laminate element, and
    wherein in this arrangement a fluid pressure medium is introducible at a pressure medium pressure of 20 bar to 300 bar which forms the hot laminate element within a time period of less than 5 seconds isostatically to the form contours or to the 3-D carrier element contours,
    wherein the tension frame or the spring frame includes a respective contact surface section including a non-flat contour at two parallel offset and opposite frame sections wherein the respective contact surface sections form a non-flat contact surface in combination, or
    wherein the tension frame or the spring frame includes a frame on which a frame assembly is supported and fixed which includes a respective contact surface section including a non-flat contour at two side walls that are parallel offset from each other and arranged opposite to each other wherein both contact surface sections form a non-flat contact surface contour,
    wherein the pressure bell respectively includes a sealing surface section at pressure bell sections that are arranged in parallel with an offset from each other and opposite to each other wherein the respective sealing surface sections include a non-flat contour which form a non-flat sealing surface contour in combination, wherein the non-flat sealing surface contour is configured congruent to the non-flat contact surface contour; and
    wherein during lifting of the lower forming tool half for reaching the closing position of the forming tool the non-flat contact surface sections reach under two parallel offset and opposing laminate element rim sections at the tension frame, the spring frame or the frame assembly and the non-flat contact surface sections move the laminate element rim sections along and eventually proximal to the sealing surface including the non-flat sealing surface contour of the pressure bell so that the entire hot flat laminate element is formed at the congruent non-flat contours monoaxial along an axis orthogonal to the laminate plane and only in the first laminate material direction thus mono directionally into a blank that is adapted to the contours and formed mono directionally.

2. The forming tool according to claim 1, wherein the non-flat contours arranged at the contact surface of the tension frame or the spring frame or at the sidewalls of the frame assembly are cambered roof shaped evenly or unevenly and respectively provided with an apex point or configured wave shaped or ascending with several steps or include other curved boundaries.

3. The forming tool according to claim 1, wherein during the lifting movement of lower forming tool half the frame of the tension frame or of the spring frame reaches under a bottom side of the frame shaped pallet at an inner circumference of the pallet with a rim zone of the frame, lifts the pallet with the laminate arranged thereon for a certain distance and thus disengages and separates the laminate from the transport frame that is fixed in place.

4. The forming tool according to claim 1, wherein a spring frame is provided that is supported at the base plate by compression springs wherein the spring frame includes a frame at which a frame assembly is supported and attached whose side walls provide the non-flat contact surface sections for forming the hot flat laminate element into the mono directionally formed blank,
    wherein the spring frame reaches an upper dead center after forming the hot flat laminate element into the mono directionally formed blank;
subsequently the lifting movement of the lower forming tool half is continued wherein the compression springs are compressed without further lifting the spring frame, and
    wherein the form with the mold contours or the 3-D carrier element with its 3-D carrier element contours penetrates at least partially through a shape of the hot blank during a continuation of the lifting movement and causes an orienting mechanical positive forming at the blank.

5. The forming tool according to claim 1,
wherein the sealing device at the sealing surface of the pressure bell is a strand shaped profile seal which includes a body that is inserted into a groove at a sealing surface,
wherein an elastic seal lip protrudes from the body which seal lip includes an outer seal lip flank and an inner seal lip flank,
wherein in a closing position of the forming tool the contact surface maintains a distance at the lower forming tool half from the seal surface at the upper forming tool half, wherein the distance has a dimension:
[thickness of the laminate element to be formed plus (100 µm to 1200 µm)]
so that a gap between the non-flat contact surface and the non-flat seal surface is formed, and
wherein the pressure fluid flowing under a high pressure fluid pressure into the pressure bell impacts an inner seal lip flank and deforms the elastic seal lip so that the seal lip bridges a gap and seals the rim zone at the mono directionally formed blank pressure tight relative to the seal surface at the pressure bell.

6. The forming tool according to claim 1,
wherein after completion of isostatic high pressure forming and reducing the pressure bell the frame shaped pallet on which the formed element or the laminated 3-D carrier element is arranged is lowerable relative to the upper forming tool half and placeable onto the transport frame that is fixed in place, and
wherein thereafter the upper forming tool half is liftable by a predetermined amount in order to render the transport frame with the 3-D formed element placed thereon or the coated 3-D carrier element removable without interference from the forming zone and movable into the loading and unloading station.

7. The forming tool according to claim 1, wherein the flat laminate element to be formed is placeable on a flat frame shaped pallet whose frame is provided at its inner circumference with a number of offset inward extending protrusions and the rim zone (6) of the laminate element is only placed onto the protrusions.

8. The forming tool according to claim 7,
wherein the tension frame or the spring frame or the side surfaces of the frame assembly supported and fixed on the frame of the spring frame include a structured outer circumference and a non-flat contact surface with inward extending recesses and outward extending bars at the outer circumference,
wherein the outer circumference is adapted to the inner circumference at the frame of the frame shaped pallet so that the clamping frame or the spring frame or the frame assembly is movable at a closed distance from the inner circumference of the pallet frame relative to the pallet that is fixed in place,
wherein the protrusions at the inner circumference of the pallet frame engage recesses at the outer circumference of the tension frame or of the spring frame or of the frame assembly,
wherein the protruding bars at the outer circumference at the tension frame or the spring frame or the frame assembly engage the intermediary spaces between two respective adjacent protrusions at the pallet frame,
wherein when lifting the tension frame or the spring frame or the frame assembly relative to the pallet that is fixed in place, the protruding bars at the outer circumference of the tension frame or the spring frame or the frame assembly reach below the rim sections of the flat laminate element and move them along so that they deposit the laminate element on the contact surface at the tension frame or at the spring frame or at the frame assembly,
so that during an additional lifting of the tension frame or of the spring frame or of a frame shaped super structure with respect to the fixated upper forming tool half the laminate element is formed mono directionally into a mono directionally formed blank between the non-flat contact surface contour and the congruent non-flat sealing surface contour.

9. The forming tool according the claim 8, wherein vertically protruding mandrels are attached at selected protrusions at an inner circumference of the pallet frame wherein the mandrels engage bore holes or slotted holes that are recessed in the rim zone of the laminate element so that portions of the rim zones can slide on the frame of the frame shaped pallet.

* * * * *